US007676662B2

(12) United States Patent
Gardner

(10) Patent No.: US 7,676,662 B2
(45) Date of Patent: Mar. 9, 2010

(54) VIRTUALIZATION OF A NON-PRIVILEGED INSTRUCTION THAT BEHAVES DIFFERENTLY WHEN EXECUTED BY PRIVILEGED CODE THAN BY NON-PRIVILEGED CODE

(75) Inventor: Robert D. Gardner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1197 days.

(21) Appl. No.: 10/903,613

(22) Filed: Jul. 31, 2004

(65) Prior Publication Data

US 2006/0095904 A1 May 4, 2006

(51) Int. Cl.
*G06F 9/00* (2006.01)
(52) U.S. Cl. .............................. 712/227; 718/1; 712/244
(58) Field of Classification Search .................. 718/1; 712/244, 227
See application file for complete search history.

(56) References Cited

U.S. PATENT DOCUMENTS

| | | | |
|---|---|---|---|
| 6,367,005 B1* | 4/2002 | Zahir et al. ................. | 712/228 |
| 2003/0037089 A1* | 2/2003 | Cota-Robles et al. .......... | 709/1 |
| 2004/0064668 A1* | 4/2004 | Kjos et al. .................. | 711/202 |
| 2005/0076186 A1* | 4/2005 | Traut ........................... | 712/1 |

OTHER PUBLICATIONS

Hideki Eiraku and Yasushi Shinjo "Running BSD Kernels as User Processes by Partial Emulation and Rewriting of Machine Instructions" Proceedings of BSDCon '03, Sep. 8-12, 2003. Pertinent pp. 1-13.*

* cited by examiner

*Primary Examiner*—Eddie P Chan
*Assistant Examiner*—Idriss N Alrobaye

(57) ABSTRACT

In various embodiments of the present invention, a virtual monitor can arrange to properly emulate execution of a cover instruction by operating-system code, or other code assuming to run at highest privilege level, by monitoring a window of instruction execution in which a cover instruction may be executed. Upon occurrence of an interruption, the virtual monitor may configure performance monitoring by the IA-64 processor to count the number of times a cover instruction is executed. When a subsequent attempt is made by a routine executing at a privilege level lower than the highest privilege level to read the contents of a special control register into which the contents of the CFM register would have been stored had a cover instruction been executed under conditions obtainable only to code running at the highest privilege level, the virtual monitor can determine whether or not a cover instruction was, in fact, executed by the non-privilege routine and can properly emulate access to the special control register by the routine running at less than highest privilege level. In alternative embodiments, other non-privileged instructions that behave different depending on the privilege level of the processor at the time they execute can be virtualized by the virtualization technique used for the cover instruction.

8 Claims, 24 Drawing Sheets

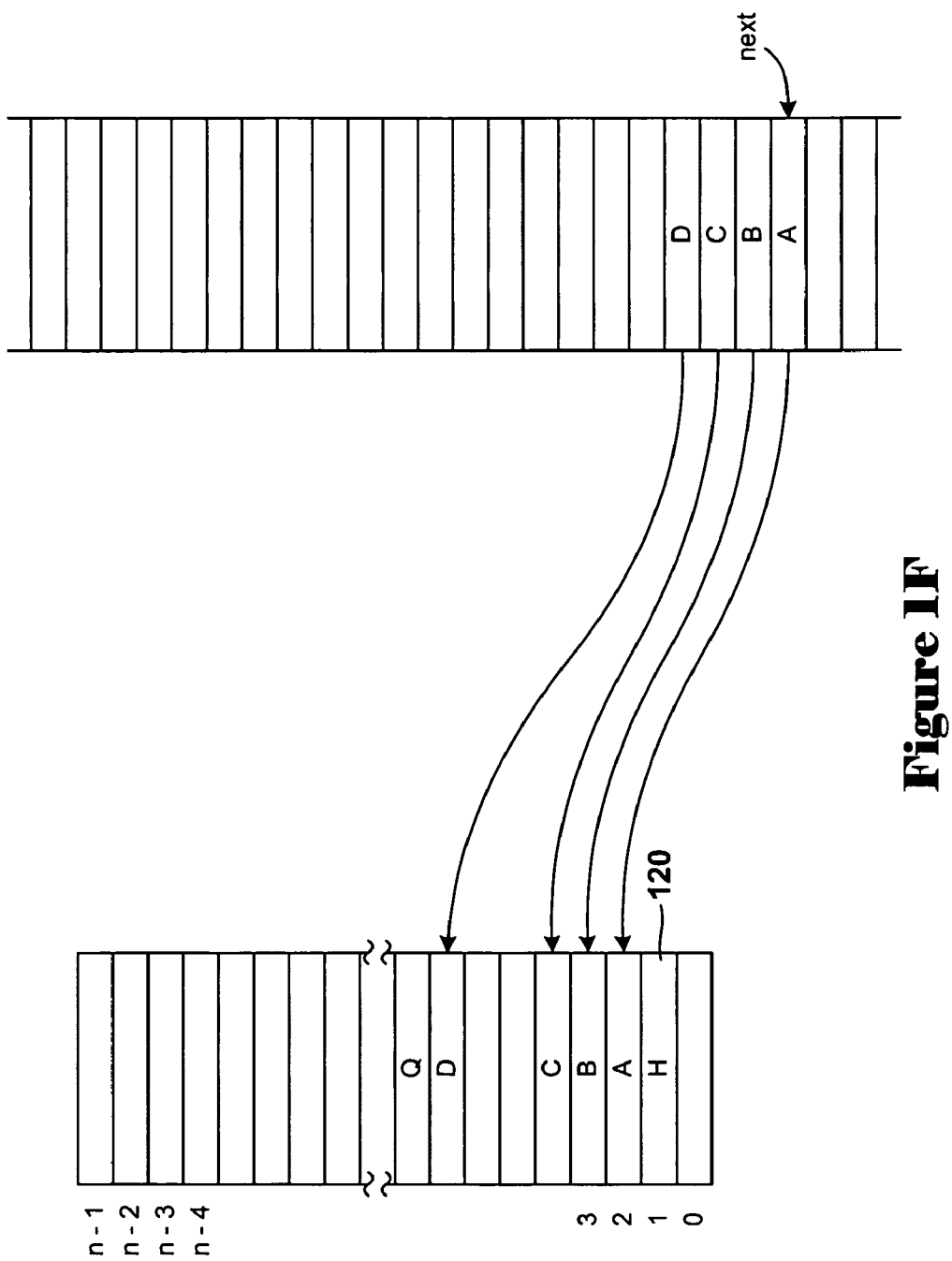

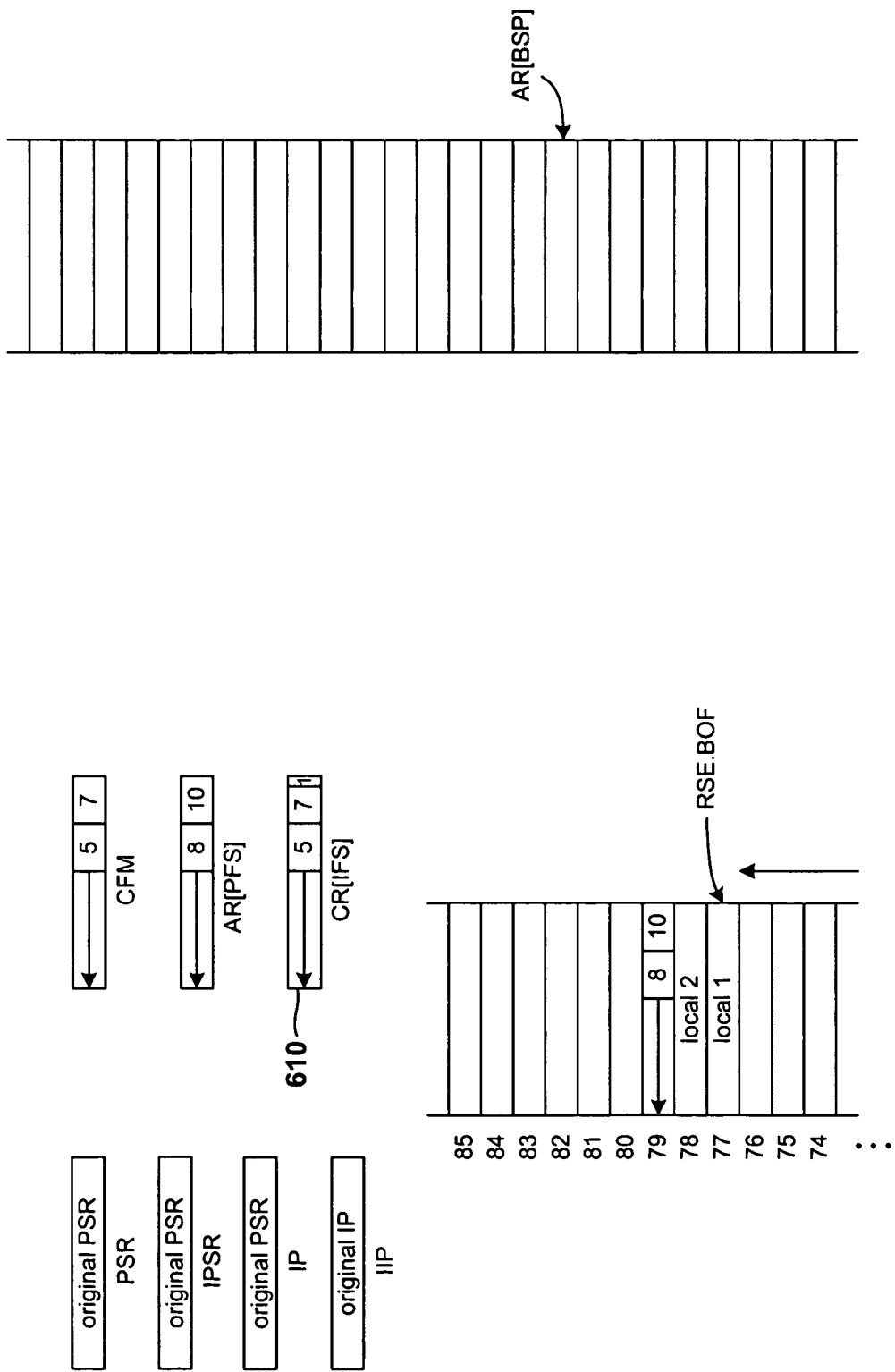

Figure 7

| |
|---|
| ⋮ |
| ld4  r16 = [r5],8 |
| add  r18 = r16,4 |
| add  r19 = r18,4 |
| ld4  r20 = [r18],8 |
| ld4  r21 = [r18],12 |
| ld4  r22 = [r18],16 |
| ld4  r23 = [r18],20 |
| ld4  r24 = [r18],24 |
| cover |
| alloc r32, 0, 10, 0, 0 |
| mov r33 = cr.ifs |
| ⋮ |

702 braces the ld4/add block; 704 → cover; 706 → alloc; 708 → mov r33 = cr.ifs

Figure 8

| |
|---|
| ⋮ |
| ld4  r16 = [r5],8 |
| add  r18 = r16,4 |
| add  r19 = r18,4 |
| ld4  r20 = [r18],8 |
| ld4  r21 = [r18],12 |
| ld4  r22 = [r18],16 |
| ld4  r23 = [r18],20 |
| ld4  r24 = [r18],24 |
| mov r10 = 6 |
| break |
| alloc r32, 0, 10, 0, 0 |
| mov r33 = cr.ifs |
| ⋮ |

802 → break

VIRTUALIZATION OF A NON-PRIVILEGED INSTRUCTION THAT BEHAVES DIFFERENTLY WHEN EXECUTED BY PRIVILEGED CODE THAN BY NON-PRIVILEGED CODE

TECHNICAL FIELD

The present invention is related to computer architecture and, in particular, to a method, in one embodiment, for virtualizing the cover instruction.

BACKGROUND OF THE INVENTION

The Intel® IA-64 architecture, also called the IPF architecture, provides instruction, internal register, and application register support for automatic stacking of register values into backing store memory following routine calls, and automatic restoring of register values from backing store memory upon completion of called routines. The IA-64 architecture provides a set of stacked registers that are architecturally treated as a circular register buffer on which register stack frames can be allocated for nested routine calls. An IA-64 processor can store, or spill, register values to backing store memory and restore register values from backing store memory automatically, using otherwise idle processor cycles, essentially asynchronously to instruction stream execution.

The cover instruction is provided by the IA-64 architecture to, among other things, facilitate register stack management and stack frame allocation by interrupt handling routines. The cover instruction allocates a new, empty, current register stack frame, nesting the stack frame of the interrupted routine and placing registers in the stack frame of the interrupted routine into a dirty-register category. In addition, under certain circumstances, the cover instruction copies the contents of a current-frame-marker register into a control register to facilitate eventual restoration of the register-based processor state of the interrupted process. However, the conditions under which the cover instruction copies the contents of the current-frame-marker register into the control register include setting of a field in a privileged register to a particular value. The cover instruction is not, itself, a privileged instruction. In general, a non-privileged routine may execute a cover instruction to allocate a new, empty, current register stack frame, but the contents of the CFM register are not stored in the control register, as happens when the privileged register field is set to the particular value, including following the occurrence of an interruption and transition from non-privileged to privileged execution.

Virtual monitors are low-level software systems that run directly above the hardware level of a computer system. A virtual monitor is intended to provide a virtual hardware interface to one or more operating systems. Virtual monitors allow for concurrent execution of multiple operating systems on a single machine, and allow for operating systems developed for the virtual machine interface provided by the virtual monitor to run on various different hardware/virtual monitor combinations. This, in turn, facilitates running operating systems on different types of machines without undertaking the extremely expensive, time consuming, and error-prone task of porting an operating system designed for one machine interface to a different machine.

Virtual monitors designed for the IA-64 architecture normally run at privilege level 0, the highest privilege level provided by an IA-64 processor. In general, operating systems are also designed to execute at privilege level 0. However, a virtual monitor is designed to provide an interface that virtualizes privilege level, so that an operating system can be run at a lower privilege level, for example, privilege level 1, so that the virtual monitor can trap attempts by the operating system to execute privileged instructions and access privileged memory. By trapping privileged-instruction execution and privileged-memory access, the virtual monitor can emulate privileged instructions provided by the virtual-monitor interface, but not supported by the hardware, and can juggle system resources between concurrently running operating systems that are developed to have full and complete control of machine hardware.

The cover instruction is a special problem for virtual monitors because it is not privileged, and can be executed both by privilege-level-0 virtual-monitor routines as well as by lower-privilege-level operating system routines. Therefore, a virtual monitor cannot easily trap attempts by an operating system to execute the cover instruction. However, in general, the operating system assumes that it can raise the privilege level to machine privilege level 0, while, in a virtualized environment controlled by a virtual monitor, the operating system is, in fact, running at virtual privilege level 0 and machine privilege level 1 or an even lower privilege level. Therefore, when the operating system executes a cover instruction, it expects that the contents of a current-frame-marker register are copied to a special, privileged control register when a field within another, privileged register is set to a particular value. But, because the operating system is actually executing at privilege level 1 or lower, the cover instruction does not copy the contents of the current-frame-marker register to the privileged control register. Thus, the cover instruction may not have the intended effect when executed by the operating system, and the virtual monitor cannot easily trap cover instruction execution by an operating system in order to emulate the cover instruction on behalf of the operating system.

In one currently available technique, operating system code can be altered by inserting break instructions, or other instructions that trap or that generate exceptions, in order to provide a virtual monitor with the ability to detect attempts by the operating system to execute the cover instruction, allowing the virtual monitor to then emulate the instruction on behalf of the operating system. However, such alteration of operating system code may be time consuming, and may also be error prone, since cover-instruction behavior depends on the current processor state, which in turn may depend on prior execution of instructions far removed from a particular cover instruction. For these reasons, designers, implementers, manufacturers, and users of virtual monitors have recognized the need for alternative methods for virtualizing an IA-64 cover instruction.

SUMMARY OF THE INVENTION

In various embodiments of the present invention, a virtual monitor can arrange to properly emulate execution of a cover instruction by operating-system code, or other code assuming an ability to run at a highest privilege level, by monitoring a window of instruction execution in which a cover instruction may be executed. Upon occurrence of an interruption or explicit setting of a particular control register field to a particular value, the virtual monitor may configure performance monitoring by the IA-64 processor to count the number of times a cover instruction is executed. When a subsequent attempt is made by a routine executing at a privilege level lower than the highest privilege level to read the contents of the particular control register into which the contents of the current-frame-marker register would have been stored had a cover instruction been executed under conditions obtainable only by code running at the highest privilege level, the virtual monitor can determine whether or not a cover instruction was, in fact, previously executed by the non-privilege routine since the interruption or explicit setting of the particular control register field to the particular value, and can properly emulate access to, and the contents of, the special control register by the routine running at less than highest privilege level. In alternative embodiments, other non-privileged instructions that behave different depending on the privilege level of the processor at the time they execute can be virtualized by the virtualization technique used for the cover instruction.

BRIEF DESCRIPTION OF THE DRAWINGS

FIGS. 1A-F illustrate a generalized method for saving state on a system stack by a first routine during a call by the first routine to a second routine.

FIGS. 6A-D illustrate RSE operation in relation to interrupt handling by an IA-64 processor.

FIG. 7 illustrates a short section of assembly code within operating system code of an operating system, execution of which needs to be virtualized by virtual monitor.

FIG. 8 shows the short assembly-language excerpt, shown in FIG. 7, with the cover instruction (704 in FIG. 7) replaced by a break instruction 802.

DETAILED DESCRIPTION OF THE INVENTION

Embodiments of the current invention are directed to efficient virtualization of the IA-64 cover instruction, and virtualization of related instructions in related computer architectures, that provide automated register-value store to, and register-value restoration from, backing store memory to facilitate routine calls. Full understanding of certain embodiments of the present invention are facilitated by an understanding of the IA-64 architecture. Therefore, an overview of the portions of the IA-64 architecture related to the IA-64 register stack engine and the IA-64 cover instruction are provided in a first subsection, followed by detailed discussion of embodiments of the present invention in a second subsection.

Figure 1A:
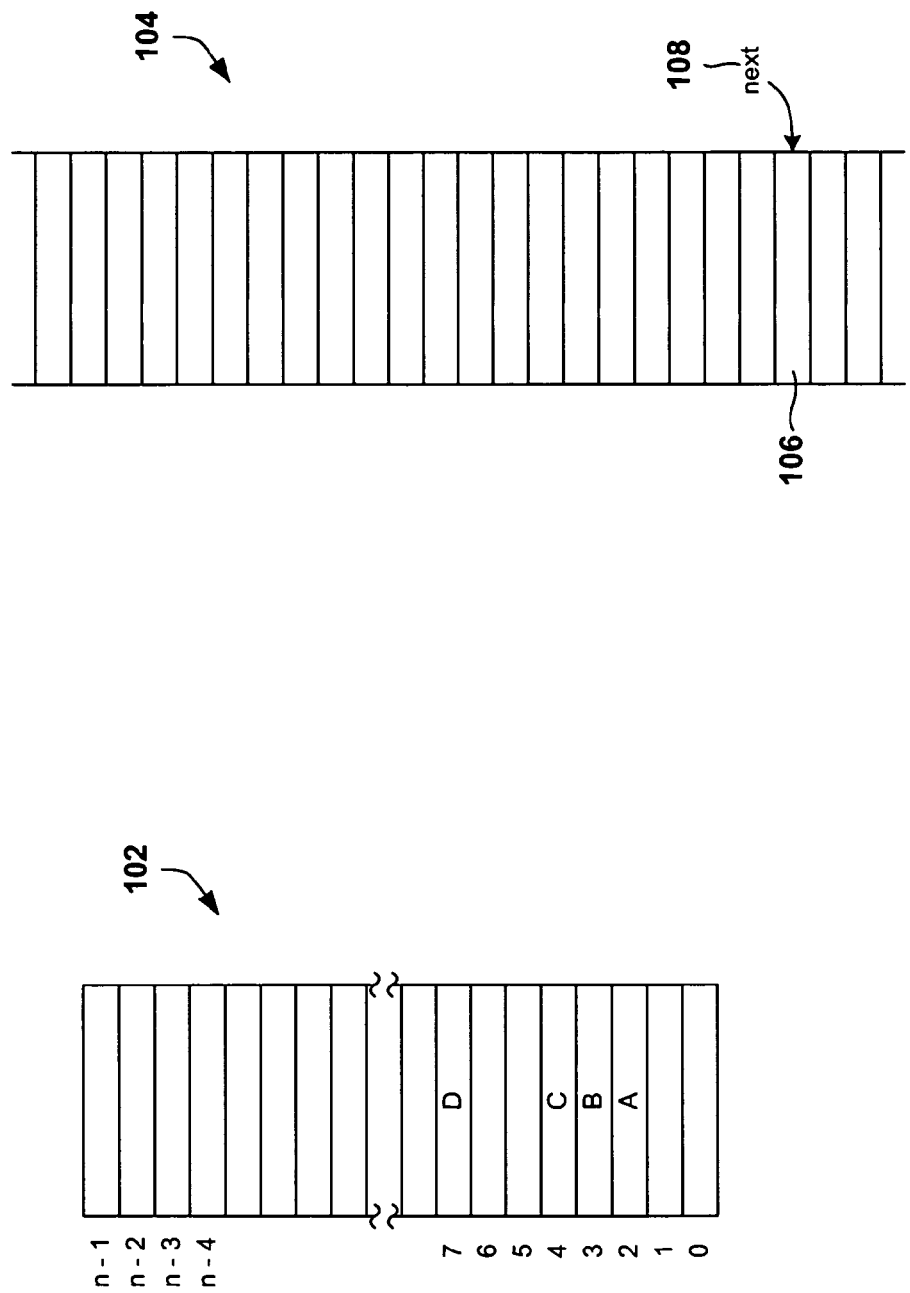

Additional Background Information on IA-64 Architecture Features Related to Register Stacking FIGS. 1A-F illustrate a generalized method for saving state on a system stack by a first routine during a call by the first routine to a second routine. FIG. 1A uses the same illustration conventions as FIGS. 1B-F. In FIG. 1A, n general registers 102 available for use by a process are shown in a column starting with register $r_0$ and ending with register $r_{n-1}$. FIG. 1A also shows a series of sequentially addressed words 104 in the memory that serve as a system stack in which the values of registers are stored and retrieved by executing processes. The next available memory word for pushing a register value onto the stack is marked, in FIG. 1A, and in subsequent figures, by a next pointer 108. In general, one of the general purpose registers $r_0$ through $r_{n-1}$ is designated, by convention, to store a pointer to the next available memory location into which a register value may be pushed. In other words, a selected register is employed to store the next pointer. In FIG. 1A, a number of symbolic values A, B, C, D are shown stored in registers r2, r3, r4, and r7, respectively. These values have been stored in the registers by the currently executing procedure. The remaining registers may also contain values stored by the currently executing procedure or by previously executing procedures, but these values are temporary, or scratch, values no longer needed by the currently executing procedure or by previously executing procedures.

In the relatively general and simple architecture employed in FIGS. 1A-F, there is one, single set of general purpose registers that define the current state of the processor and that are time multiplexed on behalf of multiple, concurrently running processes and shared by various routines that are invoked and execute within the context of a single process or thread. Therefore, when a currently executing routine invokes a next routine via a routine call, any values currently stored in registers that will be needed by the currently executing routine following return of the called routine need to be saved in memory, so that the called routine can freely use the set of general registers during the called routine's execution. Registers are essentially a very small, but extremely fast set of memory resources within the processor, used for locally storing values generated and manipulated by execution of instructions on the processor. In addition, certain special registers hold values that control and define various aspects of processor behavior. For example, in most computer architectures, one special register holds the memory address of the next instruction to be fetched and executed by the processor, commonly referred to as the instruction pointer ("IP") register, and another register contains numerous bits and bit fields that define various aspects of processor behavior, commonly referred to as the processor status register ("PSR").

The exact method by which registers are saved and restored when one routine invokes another routine, and when an invoked routine completes execution and returns control to the invoking routine, are somewhat arbitrary, and are encoded in compilers used to compile high-level programs into machine code. In some systems, for example, it is the responsibility of the calling routine to save register values prior to invoking another routine and to restore register values following completion of the called routine. In other systems, it is the called routine's responsibility to store and restore register values. In yet other systems, the calling routine stores the register values, and the register values are restored as a part of the return of control from the called routine to the calling routine.

FIGS. 1B-F illustrate one of numerous possible schemes for storing register values upon routine invocation and restoring register values upon invoked routine termination. In the example illustrated in FIGS. 1A-F, the calling routine stores any register values that the calling routine needs to preserve for use following completion of a routine call in a system-stack data structure in memory. To store a register value on the stack, an operation commonly referred to as pushing the value onto the stack, the calling routine moves the contents of the register to the memory location referenced by the next pointer, and increments the contents of the next pointer to point to either the next-largest memory location or the nextsmallest memory location, depending on whether the stack grows in the direction of higher memory addresses or in the direction of lower memory addresses. In general, the general purpose registers have a fixed length, in bits, equal to the size of the natural word employed in the computer architecture. In other words, each register stores a natural word, and each memory location also stores a natural word. In many existing computer systems, the natural words size is 32 bits, and memory is byte addressable, so that the numerical values stored in the next pointer increase by four with each push and pop operation. In newer architectures, a 64-bit word size is used, and memory may be byte, 16-bit short word, 32-bit word, or 64-bit longword addressable. Values are removed from the system stack, an operation commonly referred to as popping a value from the stack, by moving the contents of the memory location immediately preceding or following the memory location currently referenced by the next pointer, depending on whether the stack grows towards higher memory addresses or towards lower memory addresses, into a register and decreasing or increasing the value in the next pointer by an amount needed to reference the immediately preceding or immediately following memory location, again depending on whether the stack grows towards higher memory addresses or towards lower memory addresses.

Figure 1B:
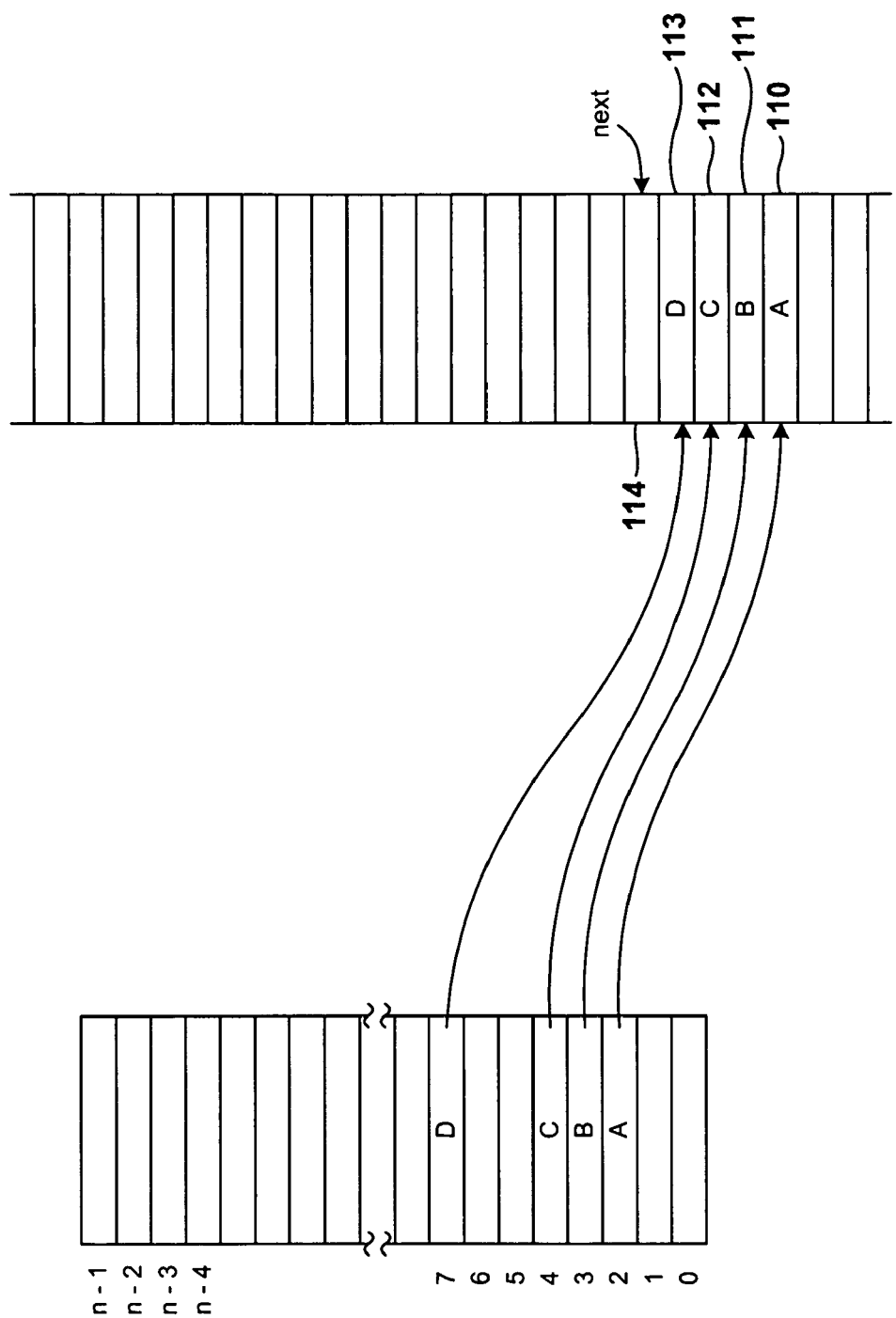
Figure 1C:
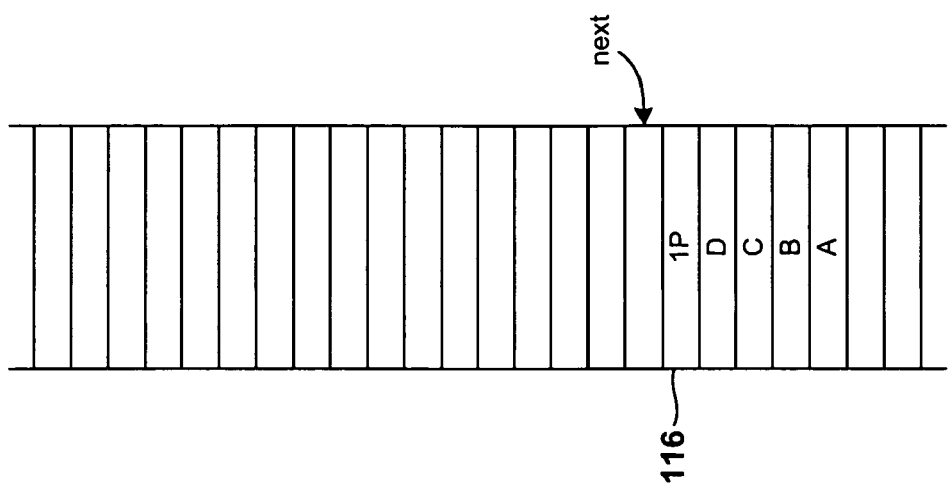
Figure 1C:
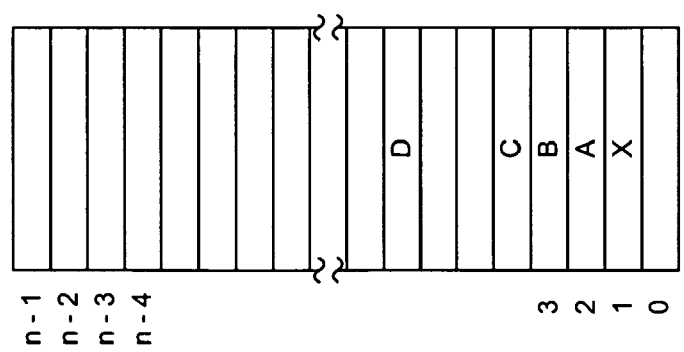
Figure 1D:
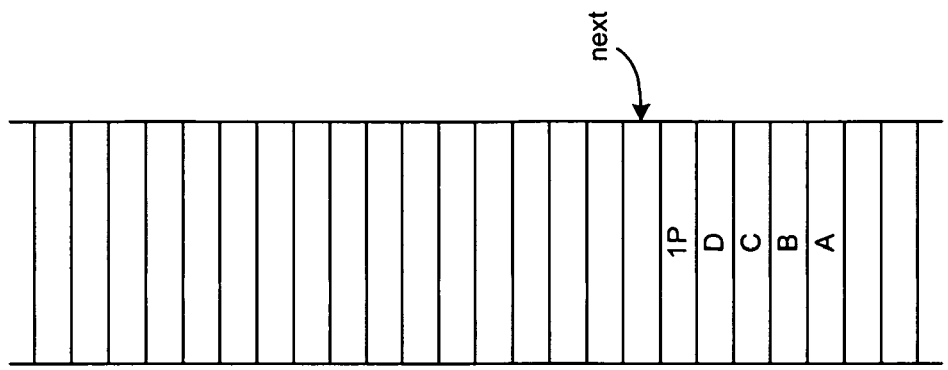
Figure 1D:
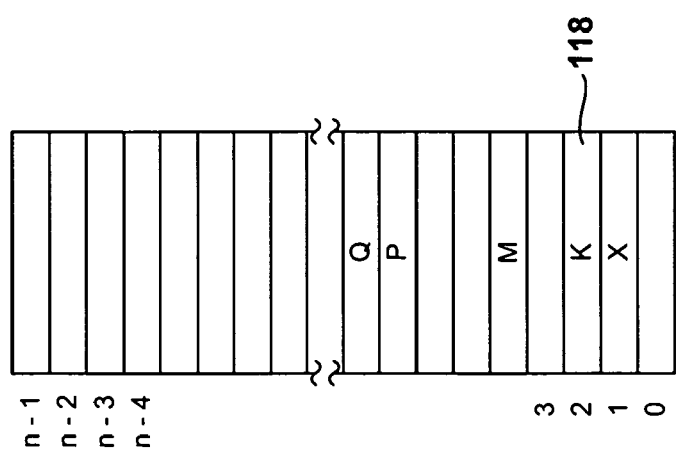

As shown in FIG. 1B, the currently executing routine prepares to call a different routine by saving values stored in registers $r_2$, $r_3$, $r_4$, and $r_7$ into the system stack via four push operations. Execution of the four push operations results in the values stored in registers $r_2$, $r_3$, $r_4$, and $r_7$ placed into memory locations 110-113, respectively. The next pointer has been correspondingly incremented to now point to the next free memory location 114. It is important to note that, in the convention illustrated in FIGS. 1B-F, it is the calling routine's responsibility to store any values maintained in registers that are needed subsequent to a routine call into the system stack, and to subsequently restore those values following the routine call. Next, as shown in FIG. 1C, the calling routine pushes the contents of the IP register onto the stack 116. Finally, control is transferred to the called routine, which begins executing and storing values into the general purpose registers, as illustrated in FIG. 1D. For example, the called routine has overwritten the value "A," previously stored in register $r_2$, with the symbolic value "K" 118. In the case that the calling routine furnishes arguments, or parameters, to the called routine, those parameters may be placed into a particular set of registers that, by convention, are assumed by the called routine to contain the parameters or arguments. Thus, for example, the called routine, currently executing in the state shown in FIG. 1D, may access the symbolic value "X" stored in register $r_1$ by the calling routine prior to invocation of the called routine.

Figure 1E:
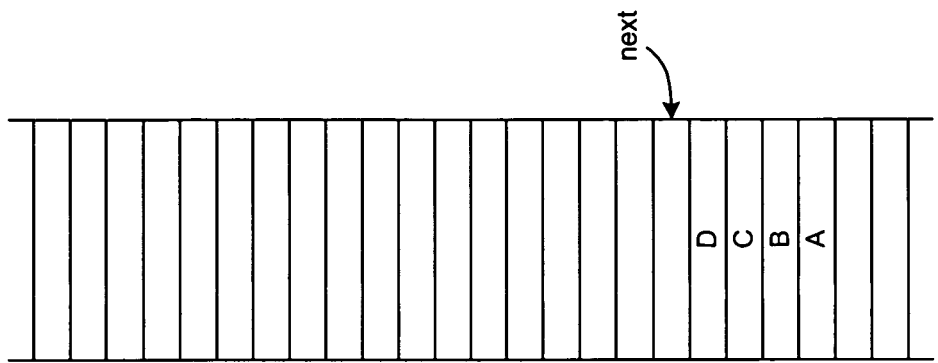
Figure 1E:
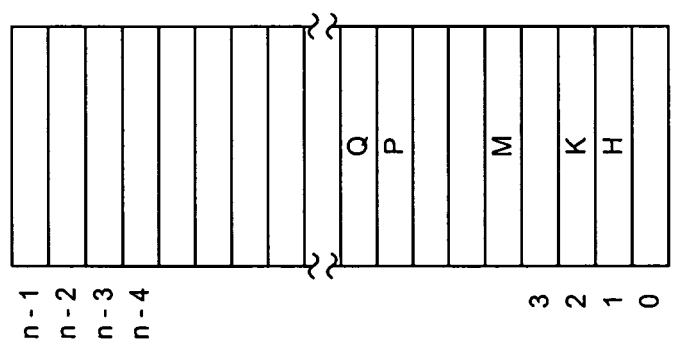

When the called routine terminates, the processor needs to be directed to return control to the instruction in the calling routine following the branch instruction or call instruction that invoked the called routine. This is accomplished, as shown in FIG. 1E, by popping the value of the IP register from the system stack and placing the saved IP value into the IP register. Control is then effectively transferred back to the calling routine which, as shown in FIG. 1F, can now pop the saved values of registers $r_2$, $r_3$, $r_4$, and $r_7$ from the system stack in order to restore the values of registers $r_2$, $r_3$, $r_4$, and $r_7$ prior to proceeding with subsequent computation. Note that the called routine can return values to the calling routine via one or more general purpose registers. For example, the calling routine has overwritten the symbolic value "X" stored into register $r_1$ by the calling routine with the symbolic value "H" 120, which is now accessible by the calling routine.

A system stack data structure is employed because routine calls may be deeply nested, with the machine state, as represented by values stored in registers, stored in successive blocks, or frames, on the system stack, with stacked frames retrieved in opposite order from the order in which they are stacked. The maximum nesting level for routine calls is bounded only by the amount of memory devoted to the system stack, and, of course, by the size of the stack frames needed for storing the state of each routine.

In modern computing, execution of even moderately complex programs can lead to very deep nesting of routine calls and stacking of very large numbers of stack frames onto the system stack. Each register store and restore operation costs valuable processor cycles, decreasing the processor bandwidth available for other calculations. Therefore, much effort has been devoted in program-language design and compiler design to efficiently using the system stack for saving register state during routine calls and during transfer of control from terminating called routines back to calling routines.

In the relatively recent Intel IA-64 processor architecture, also referred to as IPF and Itanium, a significant amount of architectural support is devoted to facilitating register store and restore operations during routine calls and transfer of control from completed routines back to calling routines This architectural support is next described.

Figure 2:
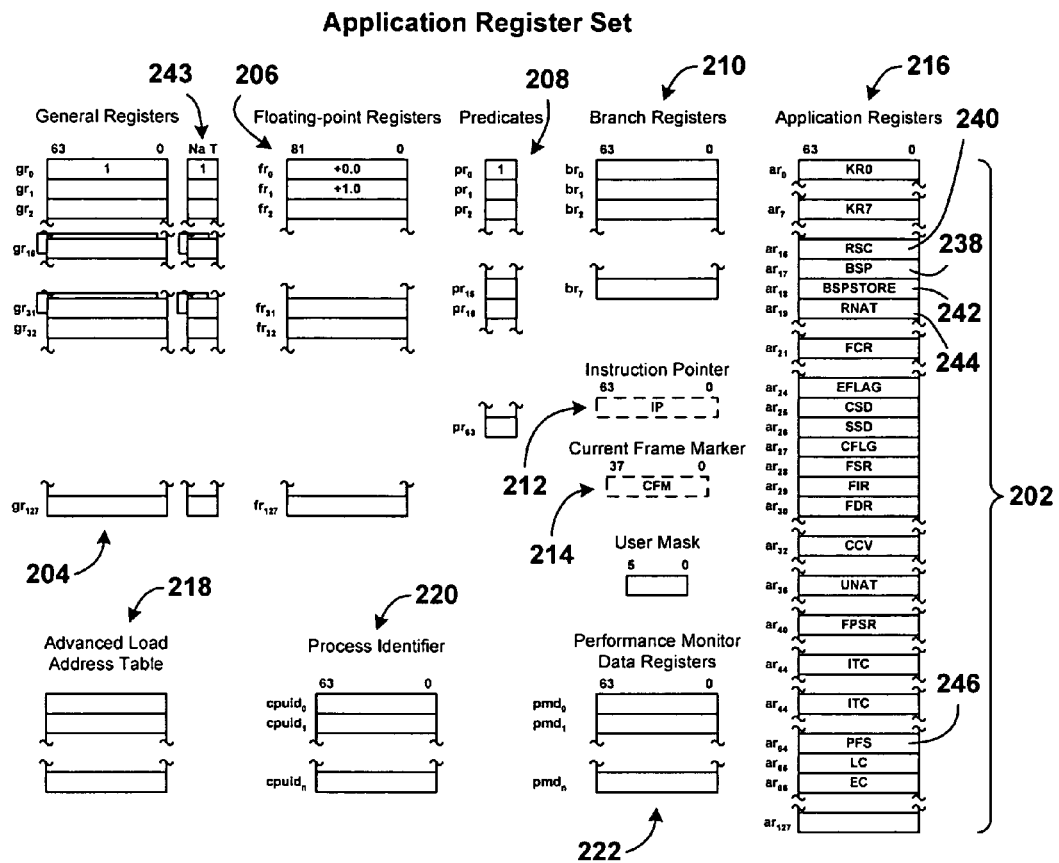
FIG. 2 shows the registers provided in the IA-64 architecture.
Figure 2:
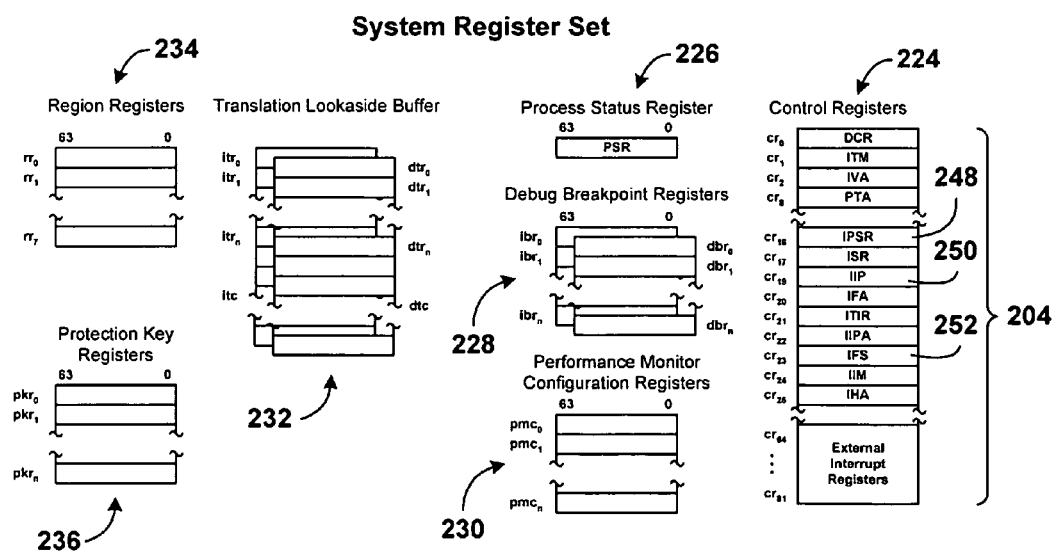

FIG. 2 shows the registers provided in the IA-64 architecture. The registers are partitioned into an application register set 202 and a system register set 204. In general, application registers are accessible at any privilege level, while system registers are accessible only when the processor is currently at privilege level 0, the highest privilege level of the four privilege levels 0, 1, 2, and 3 provided by the IA-64 architecture. In general, privilege level 0 is intended for execution of operating-system kernels, and privilege level 3 is intended for execution of application programs. The registers provided by the IA-64 architecture include a set of 128 64-bit general purpose registers 204, a set of 128 82-bit floating point registers 206, a set of 64 predicate registers 208, a set of 64 branch registers 210, an IP register 212, a current frame marker ("CFM") register 214, and a variety of special purpose registers including application registers ("AR") $AR_0$ through $AR_{127}$ 216, advance load address table registers 218, process-identify registers 220, and performance monitor data registers 222. The system registers, which are accessible only by processes or routines running at privilege level 0, include a set of control registers ("CR") 224, ranging from $CR_0$ to $CR_{81}$, a PSR register 226, break point registers 228, performance monitor configuration registers 230, a translation lookaside buffer 232, region registers 234, and protection key registers 236. Note that particular AR registers and CR registers have acronyms that reflect their use. For example, AR register $AR_{17}$ 238, the backing-store-pointer register, is associated with the acronym BSP, and this register may be alternatively specified as AR[BSP]. In many of the registers, single bits or groups of bits comprise fields containing values with special meanings. For example, the two least significant bits within register AR[RSC] 240 together compose a mode field which controls how aggressively registers are saved and restored by the processor. These two bits can be notationally specified as "AR[RSC].mode."

Each general register in the set of 128 of general registers 204 is associated with a single NaT bit stored in 128 single-bit NaT registers 242. The acronym "NaT" stands for "not a thing," and it is used to facilitate speculative loads, in which the processor loads a register from memory prior to knowing, for sure, whether the execution branch, including the load instruction, will be executed, or loading a value from memory despite a preceding, as-yet-not-executed store instruction, without knowing whether or not the store instruction overwrites the memory value. The bulk of the general registers, $GR_{31}$ through $GR_{127}$, are automatically stored into, and restored from, memory by the IA-64 register stack engine, described below. Another group of general registers, $GR_{16}$ through $GR_{31}$, are banked, so that, on an interruption, the interrupt handler may immediately acquire a different set of general purpose registers $GR_{16}$ through $GR_{31}$ that can be used without overwriting values stored in the normally resident bank of general purpose registers $GR_{16}$ through $GR_{31}$ used by application-level and lower-priority programs. The first 16 general purpose registers $GR_0$ through $GR_{15}$ are neither banked nor automatically stored and restored, and several have special purposes and behaviors.

In the following discussion of the register stack engine and IA-64 architectural support for automated storing of register values into memory and restoring register values from memory, a number of the registers shown in FIG. 2 are described in greater detail. Registers related to this subsequent discussion include: (1) the general purpose registers 204 and accompanying NAT registers 242; (2) the instruction pointer ("IP") 212; (3) the current frame marker ("CFM") 214, which stores information related to the current register stack frame allocated for the currently executing routine; (4) AR[RSC] 240, the register stack configuration register that controls operation of the register stack engine; (5) AR[BSP] 238, the register stack engine ("RSE") backing store pointer; (6) AR[BSPSTORE] 242, the RSE backing store pointer for memory stores; (7) AR[RNAT] 244, the RSE NAT-collection register; (8) AR[PFS] 246, the previous-function-state register that contains, among other things, the value that the CFM register held during execution of the most recently executing, but now stacked, routine; (9) the PSR register 226, the IA-64 process status register; (10) the CR[IPSR] 248, CR[IIP] 250, and additional CR registers involved with storing processor state upon interrupts; (11) the CR[IFS] register 252, the interruption-function-state register; and (12) the performance monitor configuration registers 230 and the performance monitor data registers 222.

Figure 3A:
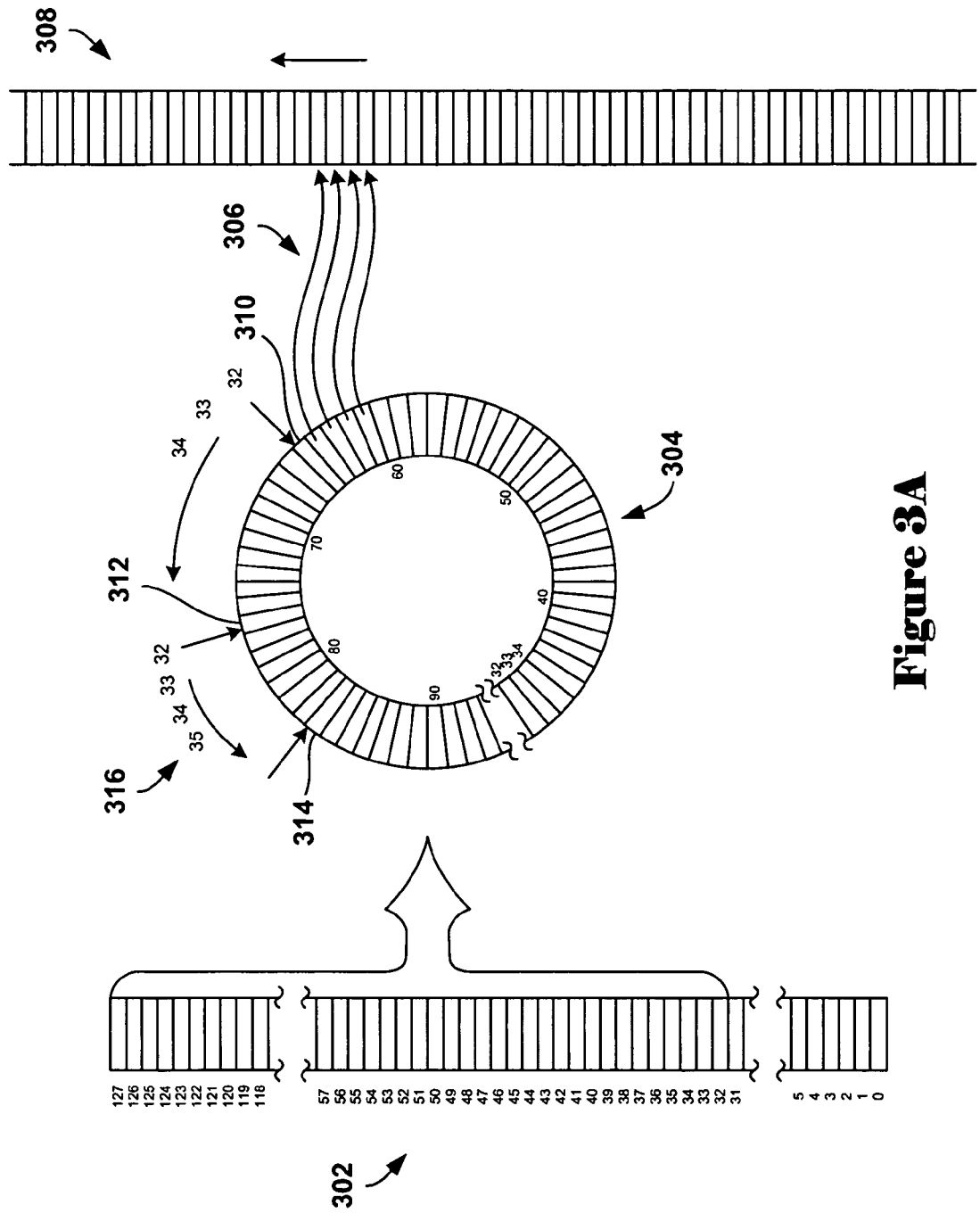
FIGS. 3A-B illustrate the general approach for automated register store and retrieval of register values carried out by the register stack engine ("RSE") provided by the IA-64 architecture.
Figure 3B:
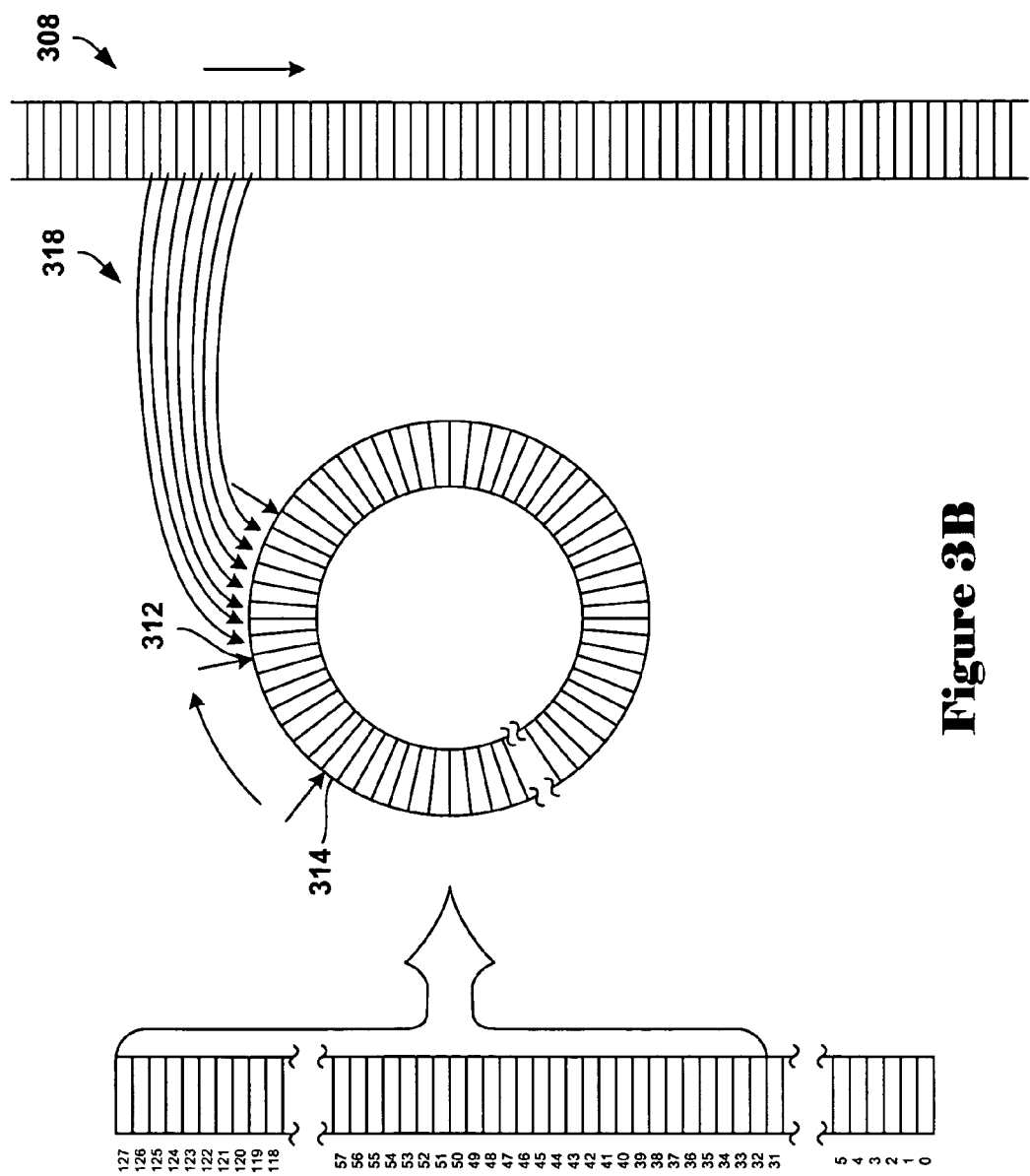

FIGS. 3A-B illustrate the general approach for automated register store and retrieval of register values carried out by the register stack engine ("RSE") provided by the IA-64 architecture. As shown in FIG. 3A, the RSE considers the 96 general purpose registers $GR_{31}$ through $GR_{127}$ 302 to be a circular register buffer 304. The RSE considers this circular register buffer to be essentially infinite, with registers of stacked register-stack frames automatically written 306 to memory 308 by the IA-64 processor, generally using otherwise spare, unused processor cycles essentially asynchronously to routine instruction execution. When a new routine is called, the routine is assigned a new register stack frame. The register stack frame is designated by a pointer into the circular buffer of registers 304. For example, in FIG. 3A, one stack frame begins with register $GR_{65}$ (310), a second stack frame begins with register $GR_{76}$ (312), and the next available stack frame begins with register $GR_{83}$ (314). The currently executing routine is assigned the current stack frame 316 beginning with general purpose register $GR_{76}$. For convenience, the general registers of the current stack frame, registers $GR_{76}$-$GR_{82}$ are renamed to registers $GR_{32}$-$GR_{38}$. The currently executing routine may increase or decrease the size of the current stack frame in order to acquire sufficient general purpose registers needed for computation. Thus, the currently executing routine, in the example shown in FIG. 3A, may assume availability of general purpose registers $GR_0$-$GR_{38}$, with general purpose registers $GR_{32}$-$GR_{38}$ automatically stored to memory and retrieved from memory as a result of routine calls made by the currently executing routine and called routine completion, respectively.

Thus, to summarize, general purpose registers $GR_0$ through $GR_{15}$ are static, and available for use by all routines and processes. General purpose registers $GR_{16}$ through $GR_{30}$ are essentially static for application routines, but are banked to provide scratch space for interrupt-handling routines. General purpose registers $GR_{32}$ through $GR_{127}$ are considered to be a circular register buffer, as shown in FIG. 3A, on which stack frames are allocated for routines, much like the system stack is directly managed by routines in simpler systems as discussed above with reference to FIGS. 1A-F. The circular buffer of registers is composed of the final 96 general purpose registers, but the registers are renamed for convenience of executing processes so that each executing process uses a set of registers with monotonically increasing numerical names, starting from register $GR_0$ to the highest, renamed general register within the routine's currently allocated stack frame. As shown in FIG. 3A, stack frames are allocated, upon routine calls, in a counter-clockwise direction, or in a direction of increasing numerical register name, but wrap around from general purpose register $GR_{127}$ back to general purpose register $GR_{32}$. The number of stack frames ultimately allocated is bounded only by the size of the backing store 308, since stack frames below the currently allocated stack frame are automatically stored to backing store memory and thus freed to allow for allocation of subsequent stack frames. As shown in FIG. 3B, as the most nested routine completes, and releases its stack frame, the next available stack frame pointer 314 moves in a clockwise direction back to the next most recently allocated stack frame 312, which again becomes the current stack frame. Register values in the now current stack frame, if not already reloaded from the backing store, may be restored 318 from the backing store 308 automatically by the processor.

Figure 4:
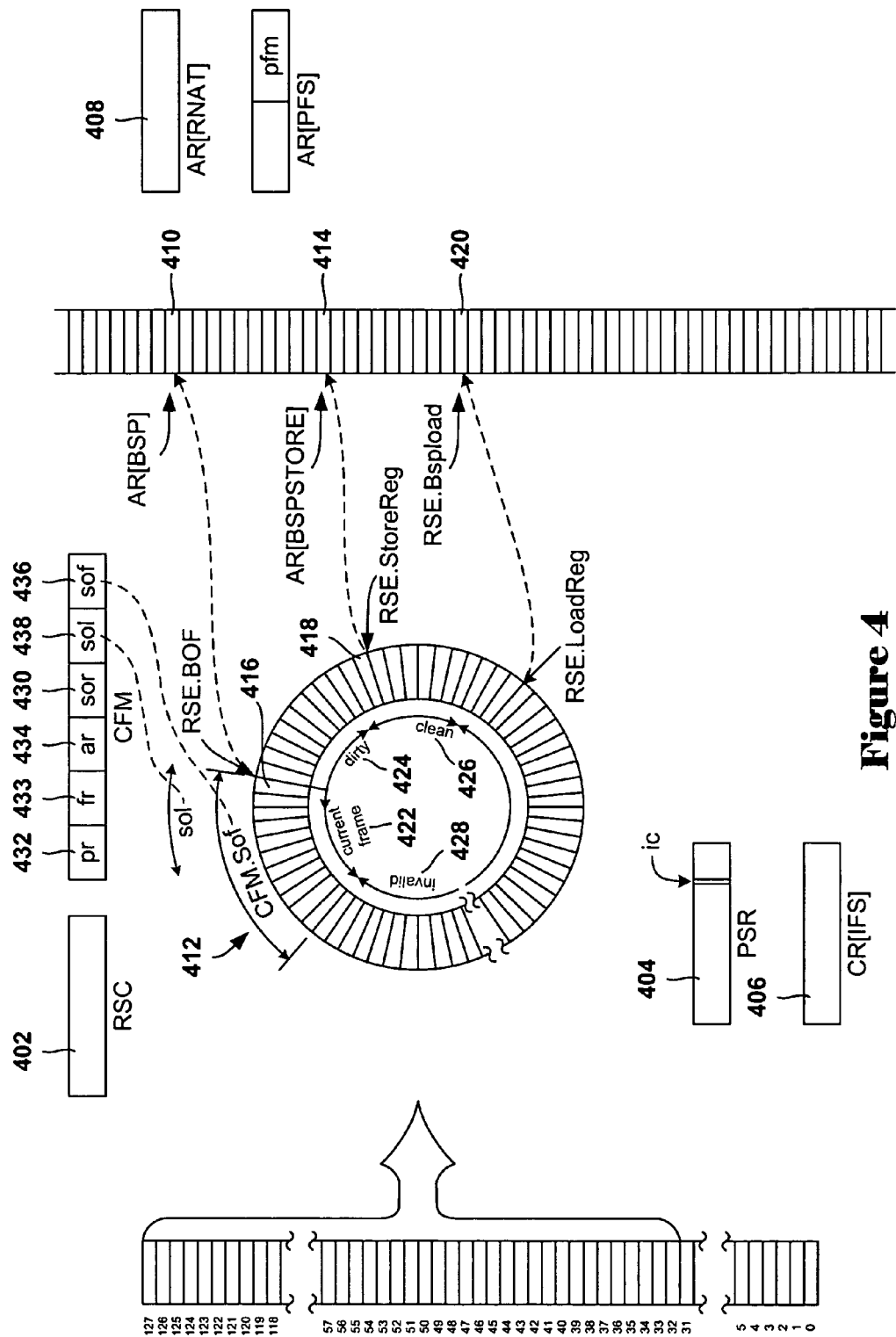
FIG. 4 illustrates control values that control the circular register buffer and the RSE.

FIG. 4 illustrates control values that control the circular register buffer and the RSE. The AR[RSC] register 402 includes fields that specify how aggressively the RSE stores and restores register frames, the privilege level for RSE loads and stores, the endian mode for the RSE, and additional values. The PSR register 404 includes a one-bit field ic that, among other things, determines how portions of processor state are saved, upon an interruption, and how the cover instruction operates. These aspects of the IA-64 architecture are discussed in further detail, below. The PSR register also contains the privilege level at which the processor is currently operating. The CR[IFS] register 406 may receive the value currently stored in the CFM register, upon interruption, and includes a single-bit field v, which indicates whether or not the CR[IFS] register contains a valid, stored CFM value. The AR[RNAT] register 408 accumulates NaT bits associated with general registers stored to backing store and, when filled with NaT bits, is itself written to backing store. Thus, the NaT bits associated with general purpose registers are stored in backing store memory and restored from backing store memory along with the values of the general registers. Every $64^{th}$ 64-bit word value in the backing store contains NaT bits, accumulated in the AR[RNAT] register and written to backing store, associated with the previously stored 63 general registers. The AR[BSP] register contains a memory reference to the next available 64-bit word 410 in the backing store to which the contents of the first word of the current register stack frame 412 may be written following a routine call and allocation of a new, current stack frame. The register AR[BSPSTORE] contains a reference to the 64-bit word in backing store memory 414 to which the RSE will store, or spill, the next dirty register from a nested stack frame.

The IA-64 processor includes various internal registers, not accessible to software routines, which also control RSE operation. These internal registers are notationally referred to by the prefix "RSE" followed by a particular register name. These internal registers include the RSE.BOF internal register, which specifies the general register 416 that represents the first register in the current register stack frame, the RSE.StoreReg internal register that stores an indication of the next general register that needs to be spilled to backing store 418, the RSE.BspLoad internal register, which indicates the next 64-bit word in backing store 420 that needs to be written back to the circular register stack buffer, and the RSE.LoadReg internal register, which stores an indication of the next general purpose register into which the 64-bit memory word referenced by RSE.BspLoad needs to be next loaded.

At any given instant in time, the circular register stack buffer may be considered to comprise four distinct regions. These regions include: (1) the current stack frame 422; (2) a region of dirty registers 424 that contain values from nested stack frames that have not yet been written to backing store; (3) a region of clean registers 426 whose values have been spilled to backing store, but have not been altered since the values were spilled; and (4) a set of invalid registers 428 that do not contain values from nested stack frames and that are immediately available for allocation for expanding the current stack frame or for allocation of new stack frames. The CFM register 430 contains fields that hold values that specify characteristics of the current stack frame. Three of the fields 432-434 contain values that facilitate register renaming. The field sof 436 contains the size, in registers, of the current stack frame. The field sol 438 contains a value indicating the size of the local portion of the current stack frame. The field sor 430 indicates the size of a rotating portion of the stack frame.

FIGS. 5A-G illustrate allocation and de-allocation of a register stack frame associated with a routine call. FIGS. 5A-G, and FIGS. 6A-D that follow, all employ the same illustration conventions. A portion of the circular register buffer 502 is shown in a linear representation, with actual general register names in a column 504 to the left of the portion of the circular register buffer, and the renamed names in a column 506 to the right of the portion of the circular register buffer. In the following, the actual register names are used, although, in practice, only the renamed register names are visible to software. The currently executing routine has been allocated a register stack frame comprising general registers $GR_{77}$ through $GR_{83}$. The currently executing routine has stored two values, symbolically represented in FIG. 5A as "Local 2" and "Local 1" into general registers $GR_{77}$ and $GR_{78}$. The currently executing routine has copied the values stored in the AR[PFS] register 508 into general register $GR_{79}$. The current stack frame size is seven, stored in CFM.sof 510 and the size of the local portion of the current stack frame is five, stored in CFM.sol 512. The registers of the current stack frame not in the local portion of the current stack frame, which comprises general registers $GR_{77}$ through $GR_{81}$, are considered to be the output portion of the current stack frame. The values in these registers are made available to a subsequently called routine, initially comprising the local portion of the stack frame allocated for the called routine. Similarly, the currently executing routine may have received values from the previously executing routine in a lower-end portion of the local part of the current stack frame. Note that routines, as a matter of course, store the contents of the AR[PFS] register 508 into a register within the local portion of the current stack frame so that later, after a series of nested routine calls and completions, the again currently executing routine can restore the value to register AR[PFS] in order to allow for de-allocation of the current stack frame upon completion of the current routine and transfer of control to the previous, most recently nested routine. Note, in FIG. 5A, that the register and memory locations referenced by RSE.BOF and AR[BSP] are indicated. It is assumed that the currently executing routine may be using general registers $GR_{80}$ through $GR_{83}$ for various computation purposes.

Figure 5A:
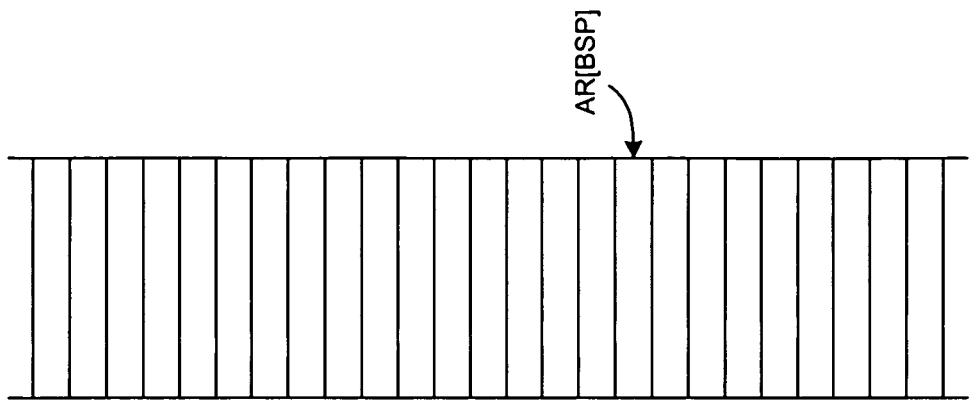
FIGS. 5A-G illustrate allocation and de-allocation of a register stack frame associated with a routine call.
Figure 5A:
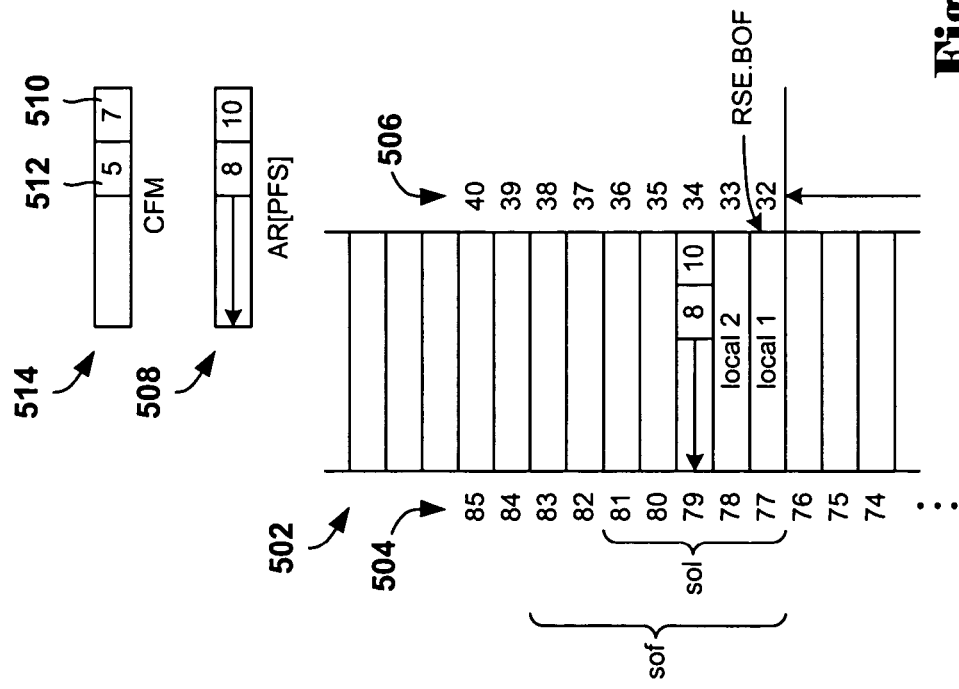
Figure 5B:
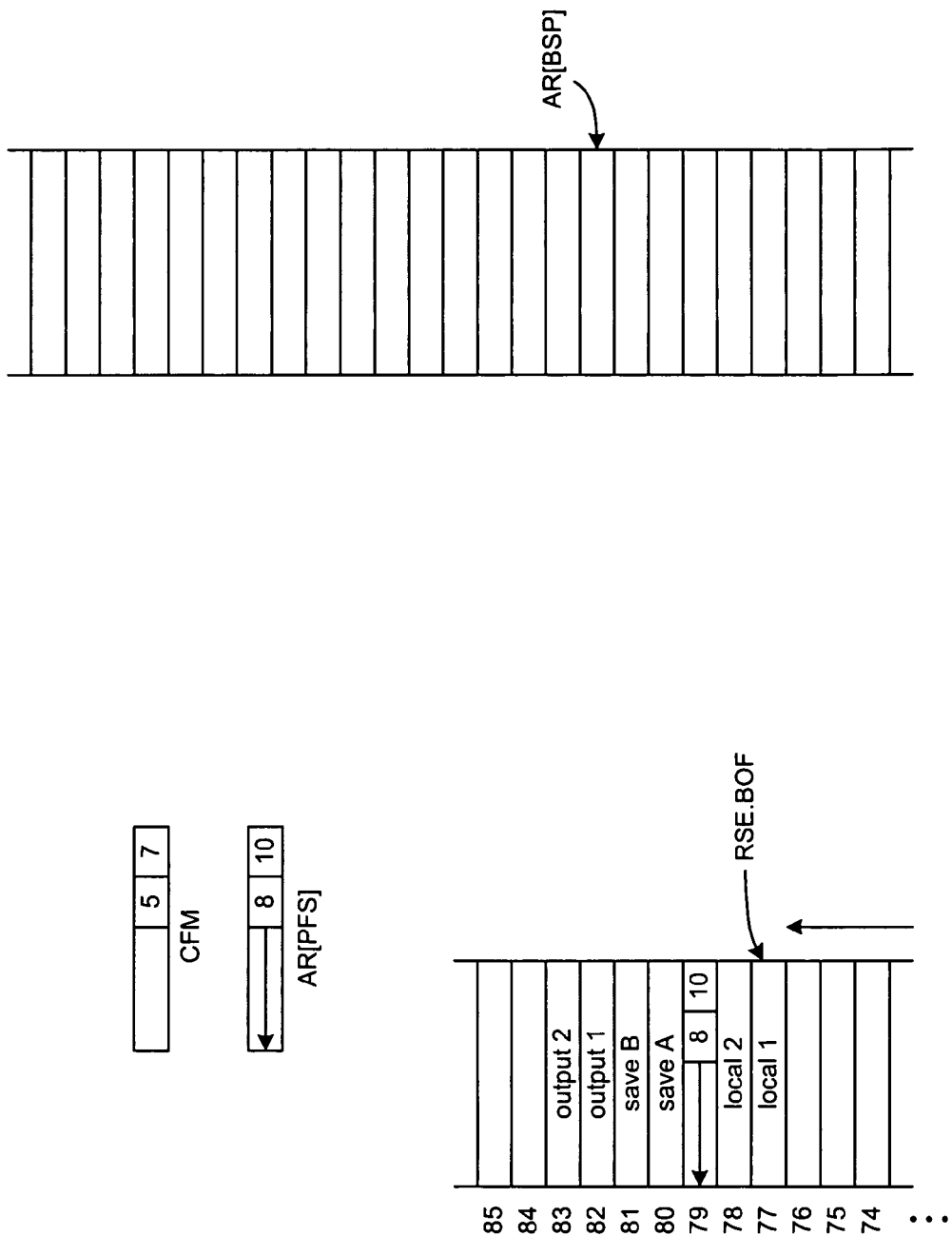

FIG. 5B shows preparations, by the currently executing routine, to call a different routine. As can be seen in FIG. 5B, the currently executing routine has saved two values, symbolically represented in FIG. 5B as "Save A" and "Save B," in general registers $GR_{80}$ and $GR_{81}$, the final two registers in the local portion of the current stack frame, and have placed two output values, symbolically represented in FIG. 5B as "Output 1" and "Output 2" in general registers $GR_{82}$ and $GR_{83}$, the output portion of the current stack frame. An output value in one of registers $GR_{82}$ and $GR_{83}$ includes a pointer to the instruction following the br.call instruction by which the currently executing routine will calls a different routine. This saved instruction pointer is subsequently used to restore the value of the IP register during a transition from the called routine back to the currently executing routine. The stored return IP value and the stored value of register AR[PFS] together provide sufficient information for a subsequent return to the currently executing routine and restoration of the register-based processor state for the currently executing routine, including restoration of the values in the various registers that control RSE operation.

Figure 5C:
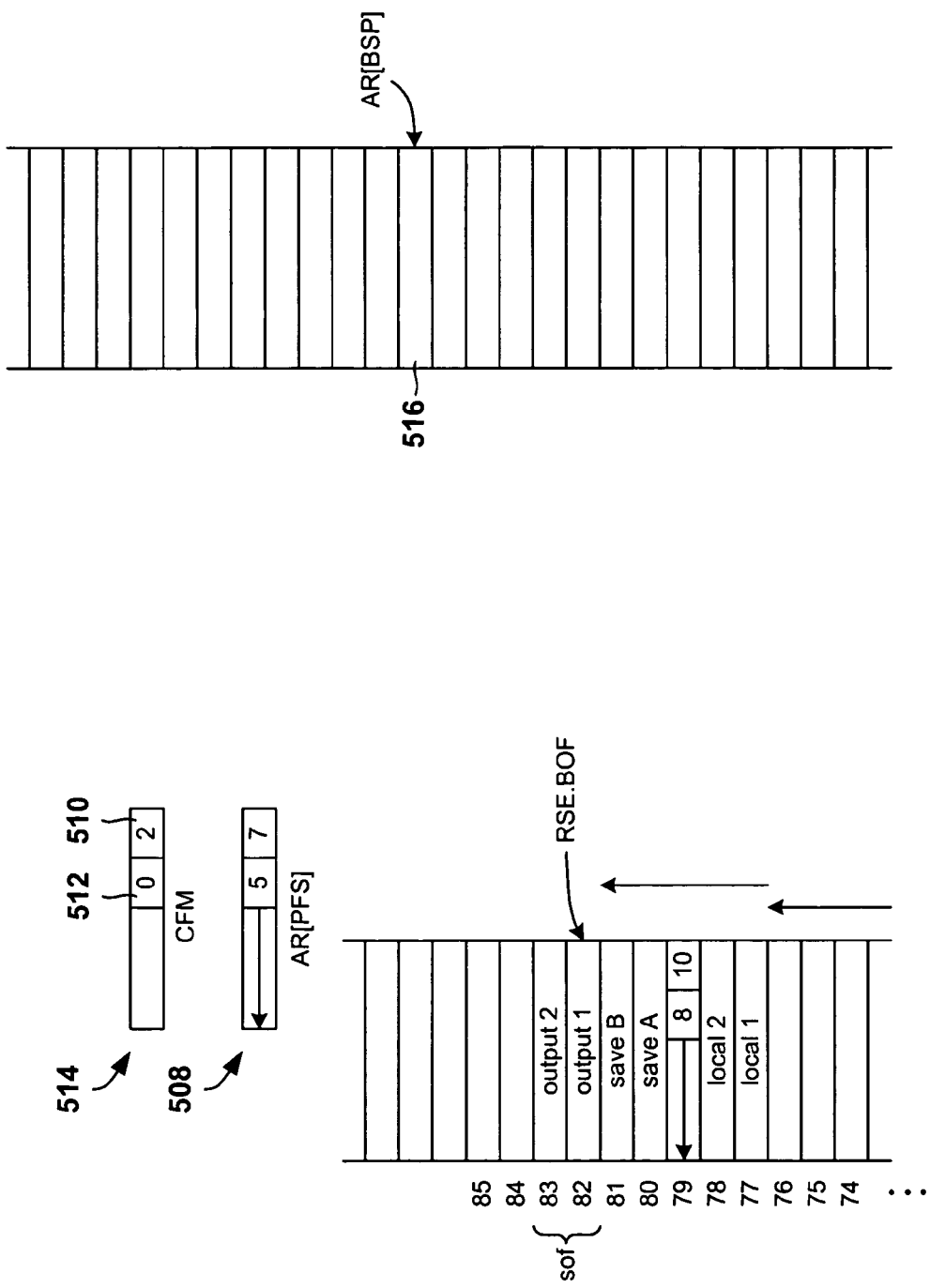
Figure 5D:
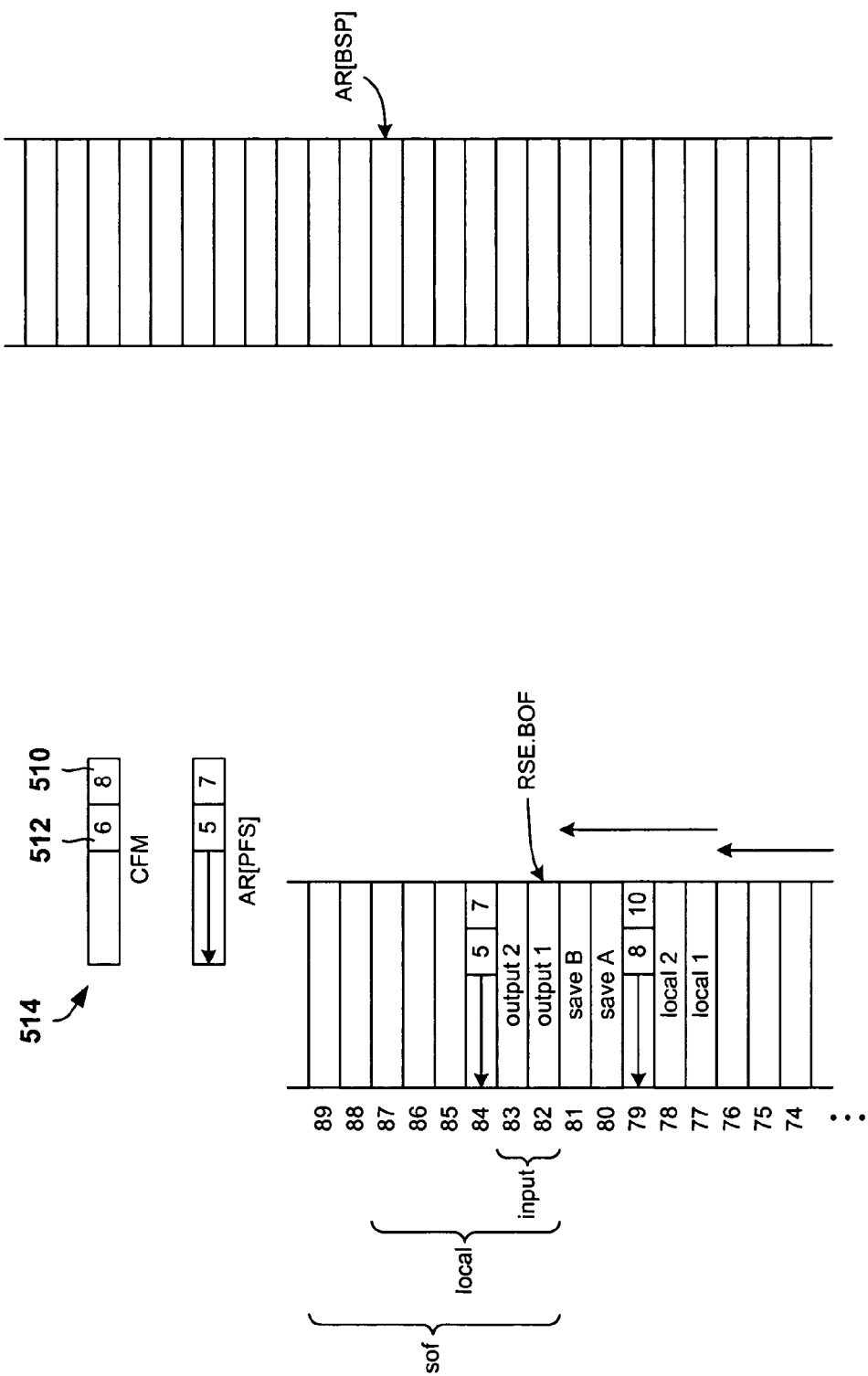

FIG. 5C illustrates a portion of the processor state following execution of the br.call instruction by the previously executing routine associated with the stack frame that begins with general register $GR_{77}$. At the point in time illustrated in FIG. 5C, the called routine has just begun execution. Note that the contents of register AR[BSP] has been adjusted to point to a new location in backing store 526 that represents the next available position for subsequent storing of the new, current stack frame allocated as part of execution of the br.call instruction. Note that the previous value of the CFM register (514 in FIG. 5A) has been moved to the AR[PFS] register 508, and that the CFM 514 contains new values that characterize a newly allocated stack frame currently comprising general registers $GR_{82}$ and $GR_{83}$. Initially, the new, current stack frame consists of the output portion of the previous stack frame, with no registers in the local portion of the newly allocated, current stack frame. Therefore, the CFM contains the value 0 for the sol field 512 and the value 2 for the sof field 510.

The newly executing, called routine generally needs to increase the size of the newly allocated stack frame to provide the called routine with high-speed storage for temporary computed values. Moreover, the called routine needs also to save the contents of the AR[PFS] register in case the called routine in turn calls additional routines, and becomes nested on the register stack below them. In order to increase the current stack frame size, the called routine executes an alloc instruction. The alloc instruction takes arguments that allow the called routine to specify the sizes of the input portion, local portion, and total stack frame desired by the called routine. In the example shown in FIG. 5D, the called routine has specified, via an alloc instruction, a current stack frame comprising a two-register input portion, including general registers $GR_{82}$ and $GR_{83}$, a four-register local portion comprising general registers $GR_{84}$-$GR_{87}$, and a total current stack frame comprising general registers $GR_{82}$-$GP_{89}$. The input portion of the current stack frame indicates the number of registers received by the called routine that were part of the previously executing routine's stack frame, and is included within the local portion of the current stack frame. Note that the sof 510 and sol 512 values of the CFM register 514 have been updated to reflect the new current stack frame.

Figure 5E:
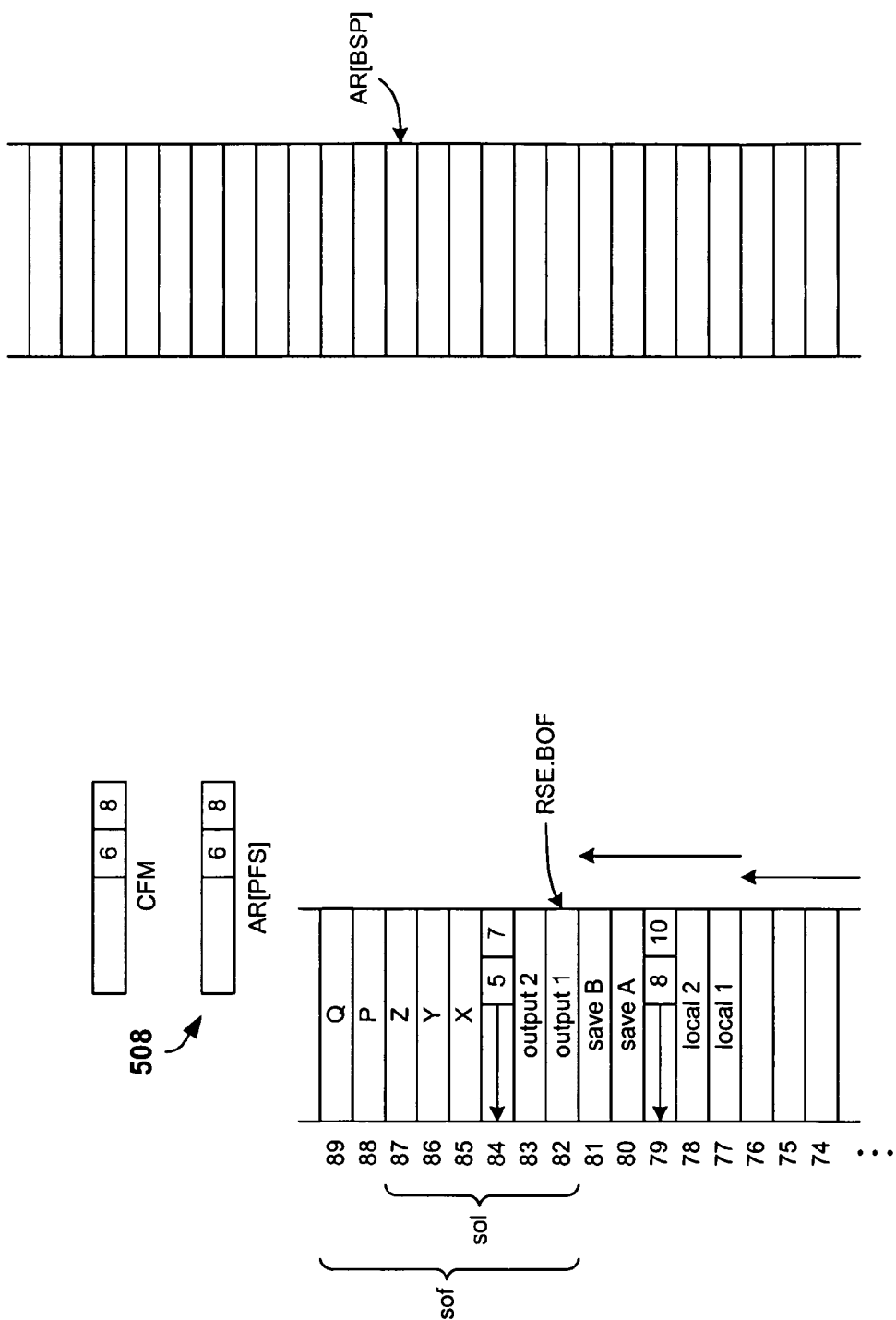
Figure 5F:
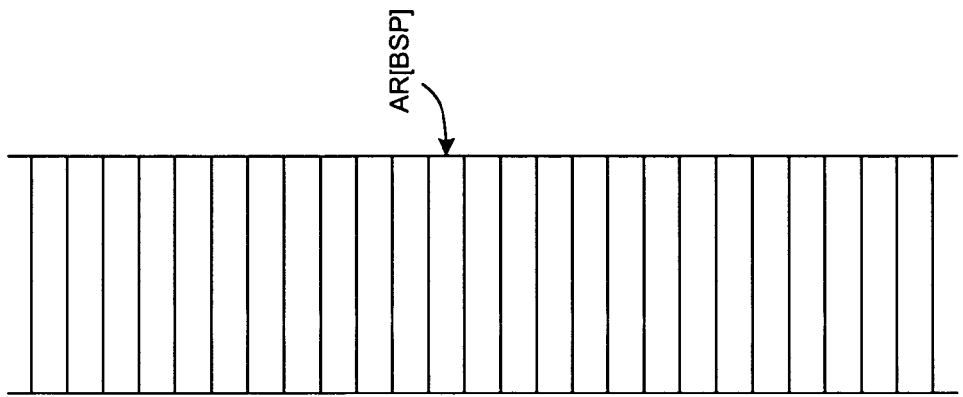
Figure 5F:
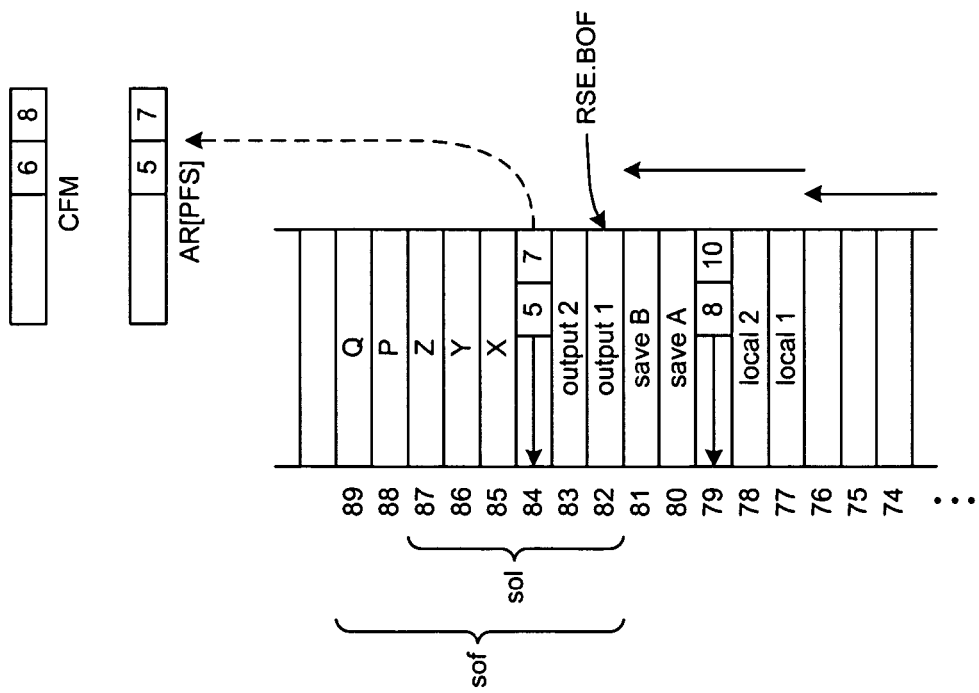
Figure 5G:
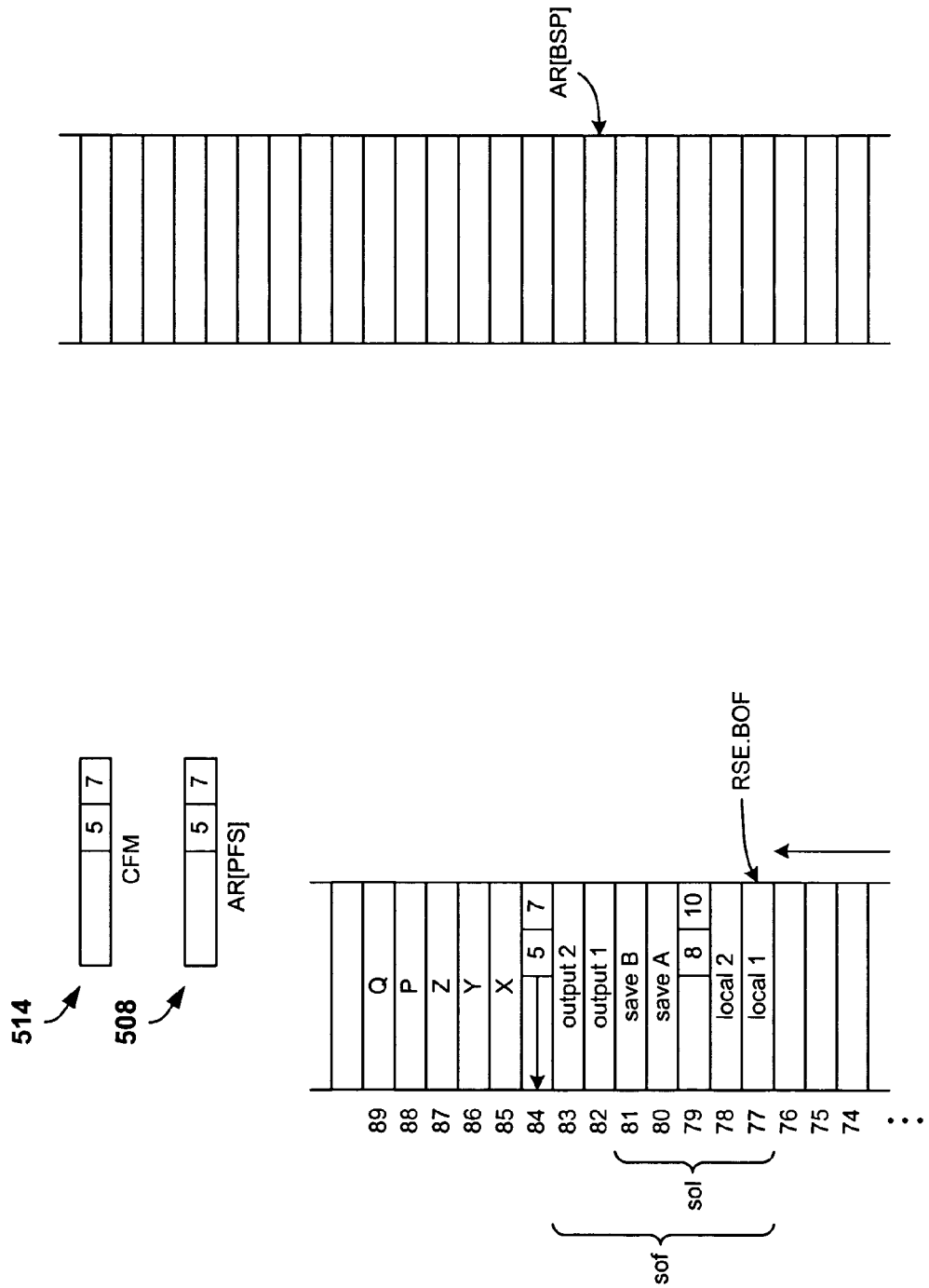

As shown in FIG. 5E, the called routine may carry out various computations, storing temporary values "X," "Y," and "Z," in registers of the current stack frame, and may, in addition, store output values "Q" and "P" in registers in the output portion of the current stack frame for passing to a subsequently called routine. Note that, as shown in FIG. 5E, subsequent routine calls and subsequently called routine terminations may end up altering the contents of the AR[PFS] register 508.

Finally, the called routine terminates. In order to transfer control back to the calling routine, the called routine must first copy the stored contents of the AR[PFS] routine from the called routine's current stack frame to the AR[PFS] register. Next, the called routine executes a br.ret instruction to return control to the calling routine. The called routine uses the IP value stored by the calling routine in an output register of the calling routine, and therefore in a local register of the called routine, in the register stack as a target for the br.ret instruction. Execution of the br.ret instruction results in resetting of the RSE.BOF internal register and the AR[BSP] registers to their previous values, de-allocating the stack frame allocated for the called routine, and restoring the stack frame allocated for the calling routine. The contents of the CFM register 514 have been updated to contain the contents of the AR[PSF] register 508. Thus, the processor state for the calling routine has been restored, including all the values of the stacked registers for the calling routine, referenced by the calling routine as general registers $GR_{32}$ through $GR_{38}$.

Figure 6A:
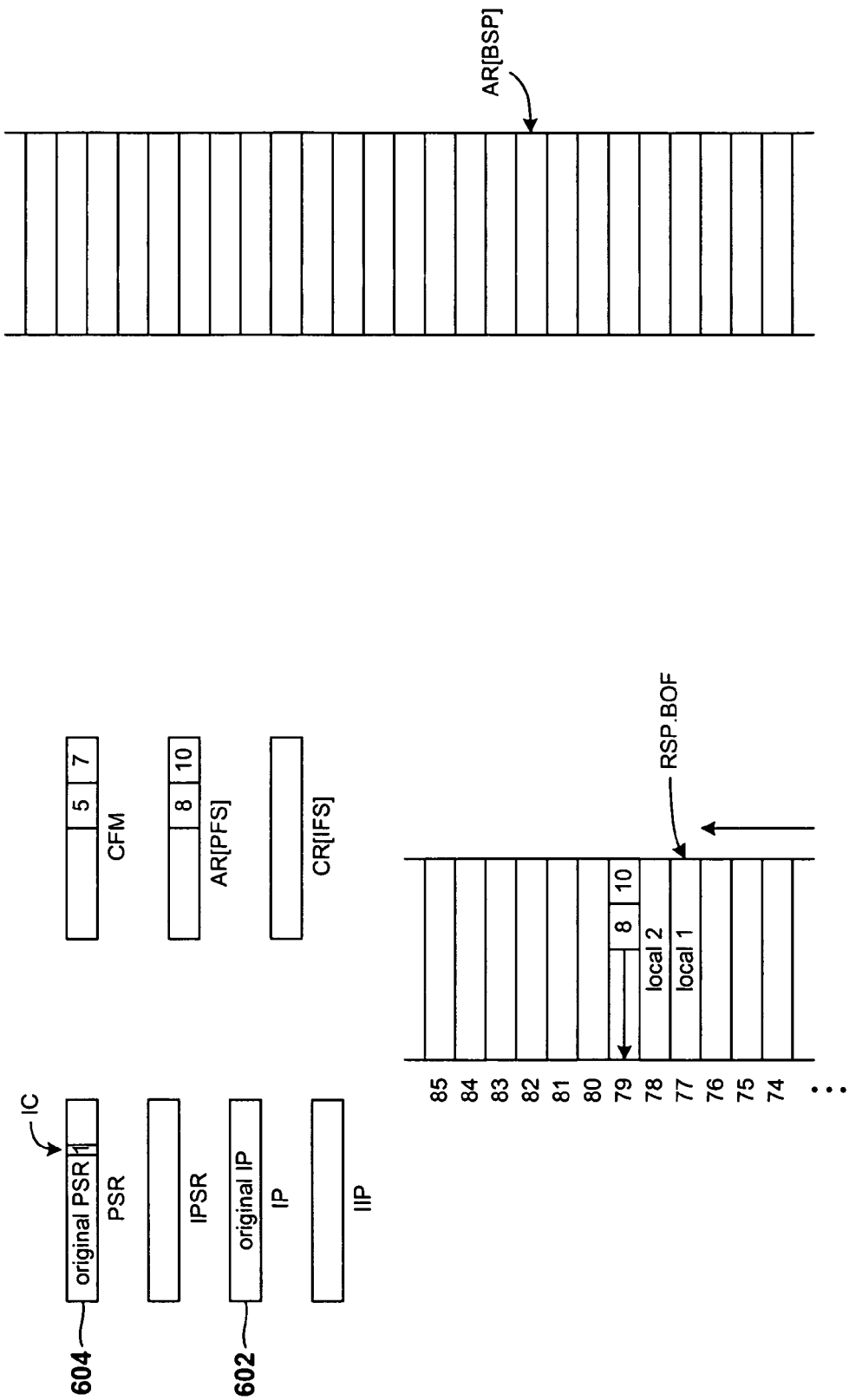

FIGS. 6A-D illustrate RSE operation in relation to interrupt handling by an IA-64 processor. FIG. 6A shows a portion of the current, register-based processor state of a processor that is currently an executing routine. The portion of the processor state illustrated in FIG. 6A includes values of the IP register 602 and the PSR register 604. In particular, the ic field of the PSR register 604 contains the value "1."

Figure 6B:
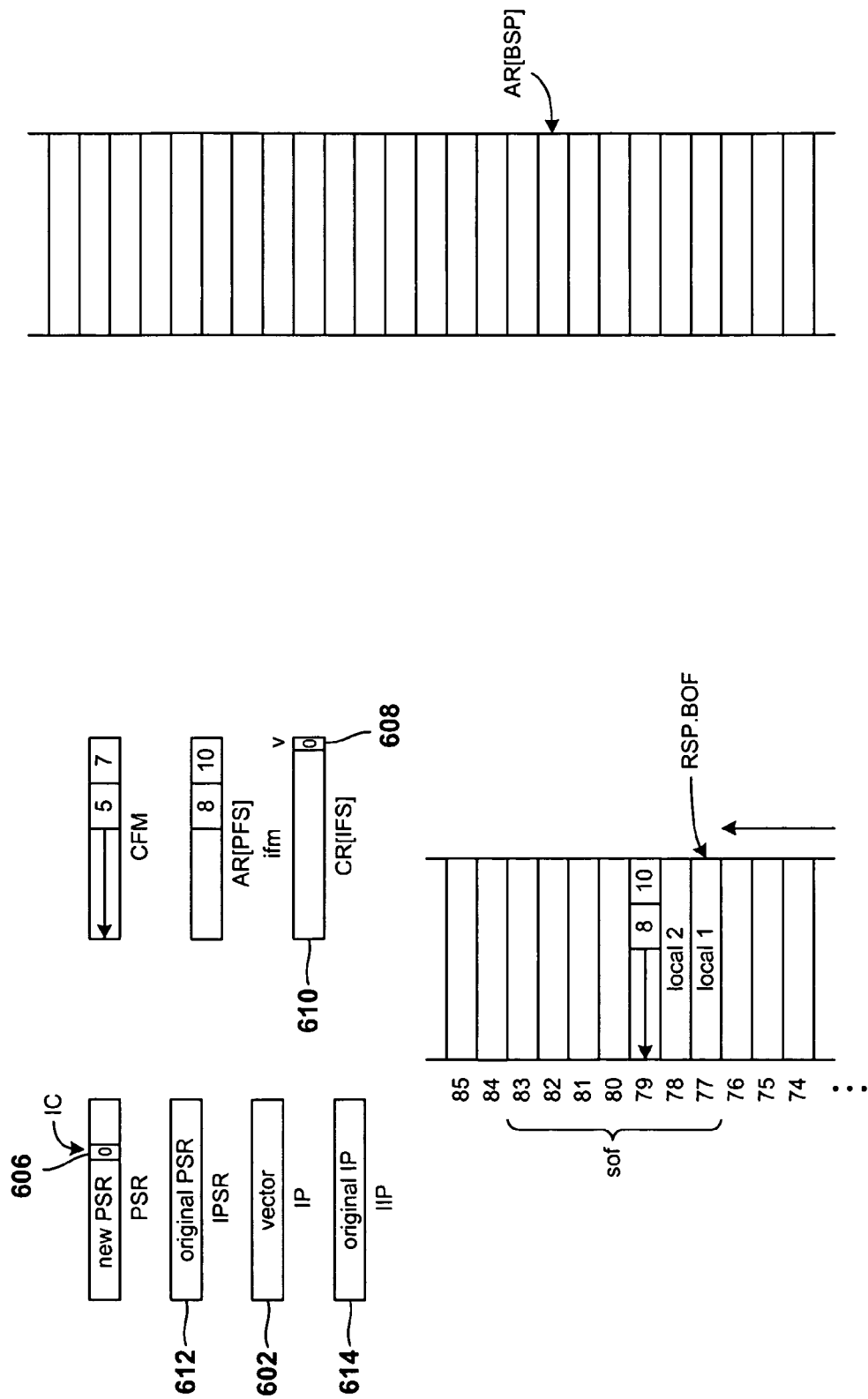

FIG. 6B illustrates a portion of the processor state following an interruption. Initially, the interruption has not altered the RSE-related register and internal register values, but has changed the value of the ic field in the PSR register to "0" 606. Note that the value of the v field 608 of the CR[IFS] register 610 is also 0. Note also that the original contents of the PSR have been copied to the IPSR register 612 and the original contents of the IP register have been copied to the IP register 614. The current contents of the IP register 602 now contain a reference to an interrupt-handling vector. Whether or not the contents of the PSR and IP are copied to the IPSR and IIP registers, respectively, is controlled by the value of the ic field of the PSR register. Normally, when non-privileged routines are executing, the ic field of the PSR register has a value "1." This value indicates that the contents of the IP and PSR registers should be copied to the IIP and IPSR registers, respectively, upon interruption. Moreover, upon interruption, the ic field of the PSR register is cleared. Clearing of the ic field essentially turns off processor-state storage in the case that a subsequent interruption occurs. If a subsequent interruption occurred, the IPSR and IIP registers would again be overwritten, removing information needed to return to the initially interrupted application routine.

Figure 6C:
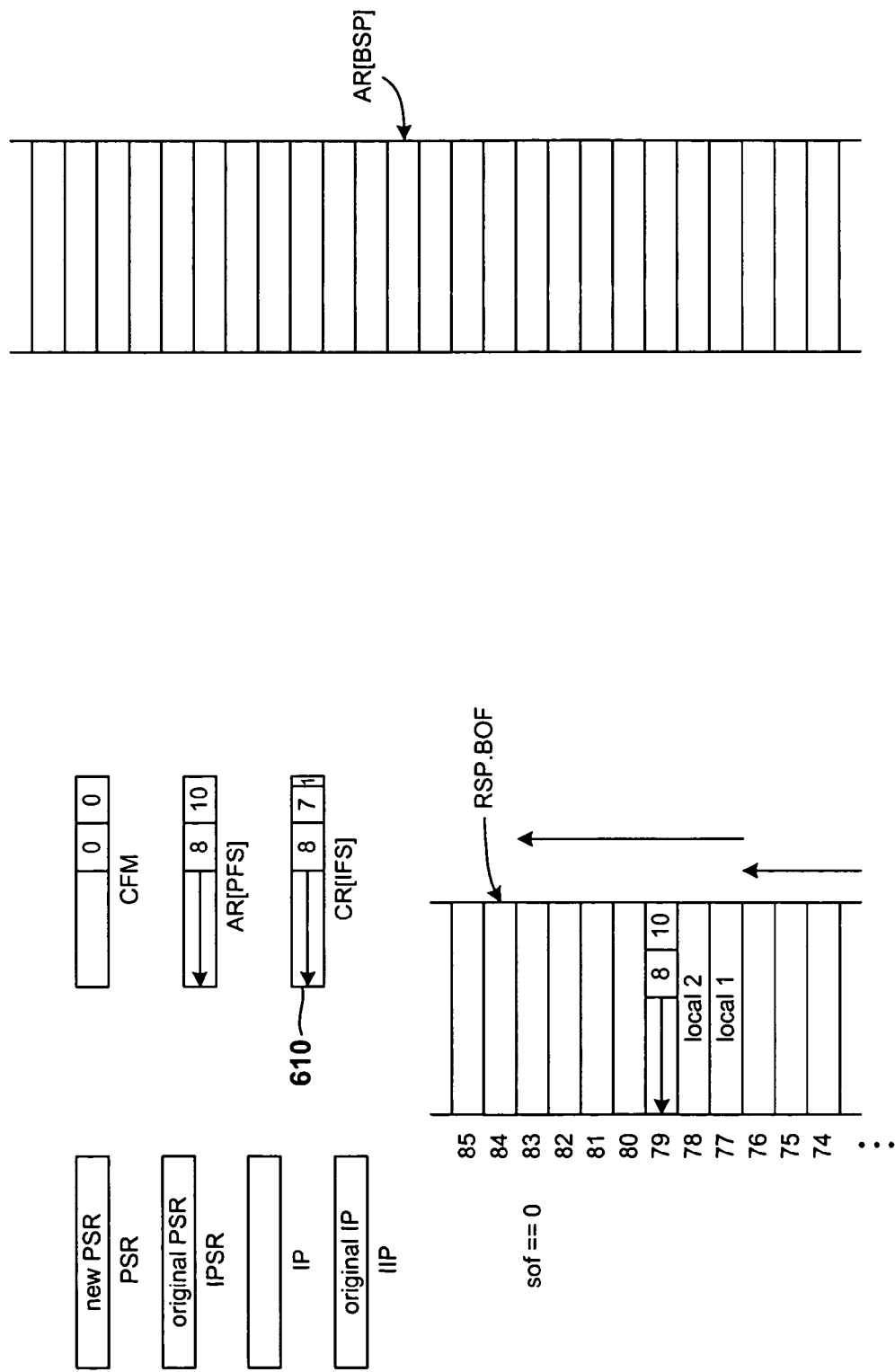

The RSE-controlling internal registers and application registers are not updated to provide a pathway for extremely efficient interruption handling for interrupt handlers that can handle an interrupt using the first 16 general purpose registers and the banked register set $GR_{16}$ through $GR_{30}$. This fast-path mechanism decreases the overhead associated with interrupt handling. However, in the case that the interrupt handler needs additional general-register resources, the IA-64 architecture provides a mechanism for those resources to be obtained. The interrupt handler may issue a cover instruction which has the effect of allocating a new, current register stack frame of size 0 and thus moving the stacked registers allocated for the interrupted routine from the current stack frame to the dirty-register region. FIG. 6C illustrates a portion of the processor state following execution of a cover instruction by the interrupt handler. When the PSR.ic field has a value "0," as it does following an interruption, the cover instruction also copies the contents of the CFM register to the ifm field of the CR[IFS] register 610. The v field of the CR[IFS] register 610 is set to "1," to indicate that the CR[IFS] register contains a valid copy of the CFM. The CFM is then updated to reflect the newly allocated stack frame of size 0. The interrupt handler can then allocate additional general register resources in order to carry out interrupt handling. Finally, the interrupt handler finishes, and executes an rfi instruction to return control back to the interrupted routine. In executing the rfi instruction, the processor notes that the v field of the CR[IFS] register 610 has the value "1," and copies the contents of the CR[IFS].ifm field into the CFM. Following execution of the rfi instruction, the original processor state of the interrupted routine is restored. Note that, when the PSR.ic field has a value "1," the cover instruction does not store the current contents of the CFM into CR[IFS].ifm, and does not set the field CR[IFS].v to 1. The cover instruction is not privileged, and can be executed by an application routine in order to allocate a new, zero-length current stack frame. However, because only a privileged routine can set PSR.ic to "0," only a privileged routine, including an interrupt handler, can obtain the full benefit of the cover instruction, namely storing of the contents of the CFM register into CR[IFS].ifm.

The IA-64 architecture provides two additional instructions relevant to RSE operation. The flushrs instruction directs an IA-64 processor to flush all dirty registers to backing store, and the loadrs instruction directs the IA-64 processor to reload register values stored in backing store to general-purpose registers.

EMBODIMENTS OF THE PRESENT INVENTION

FIG. 7 illustrates a short section of assembly code within operating system code of an operating system, execution of which needs to be virtualized by virtual monitor. The short section of operating system assembly code includes a number of load and add instructions 702 followed by a cover instruction 704, in turn followed by an alloc instruction 706 and a move instruction that transfers the contents of the CR[IFS].ifm field to a general register 708. The operating system assumes to be running at machine privilege level zero, and hence assumes that the cover instruction 704 will copy the current contents of the CFM register to CR[IFS].ifm when the PSR.ic field has the value "0," as discussed above. However, as also discussed above, the cover instruction is not privileged, and hence the virtual monitor has no convenient way of trapping execution of the cover instruction by an operating system. Moreover, because the virtual monitor arranges for the operating system to execute at a privilege level lower than the highest privilege level, the cover instruction does not copy the contents of the CFM register to CR[IFS].ifm. The virtual monitor does trap execution of the move instruction 708 because the non-privileged operating system is attempting to access a privilege register. However, at the point in time that the instruction is trapped, the virtual monitor has no way of knowing how to emulate the contents of CR[IFS]. If no cover instruction was previously executed, then the contents of CR[IFS] are invalid. However, if a cover instruction was executed at a point in time when the operating system assumed that it was running at privilege level zero, and PSR.ic had the value zero, then CR[IFS].ifm should contain the contents of the CFM register at the time that the cover instruction was executed. However, because of execution of the alloc instruction 706, the contents of the CFM register at the time of execution of the cover instruction have been overwritten. Thus, even if the virtual monitor had a way to determine that a cover instruction was executed, it has no way of emulating the value that the operating system expects to reside in CR[IFS].ifm.

As discussed above, the operating system code can be carefully analyzed to detect cover instructions needing emulation, and instructions that trap or cause exceptions can be inserted in place of the cover instruction, in order to provide a handle for the virtual monitor to trap the cover instructions and emulate behavior of the cover instruction when executed at privilege level zero. FIG. 8 shows the short assembly-language excerpt, shown in FIG. 7, with the cover instruction (704 in FIG. 7) replaced by a break instruction 802. Although this method provides a means for the virtual monitor to detect and emulate cover-instruction execution by non-privileged code that assumes that it is running at the highest privilege level, this method is time consuming and error prone. It is time consuming because the cover instruction may be executed both by non-privileged and by privileged routines. Therefore, emulation of the behavior of the cover instruction is needed only when the cover instruction is executed at privilege level zero with PSR.ic set to zero. Many instructions preceding the cover instruction may need to be analyzed in order to determine whether, in fact, the processor state expected when a particular cover instruction is executed is such that emulation is needed. Improper analysis or failure to analyze particular cover instructions may lead to improper emulation by the virtual monitor.

Figure 9:
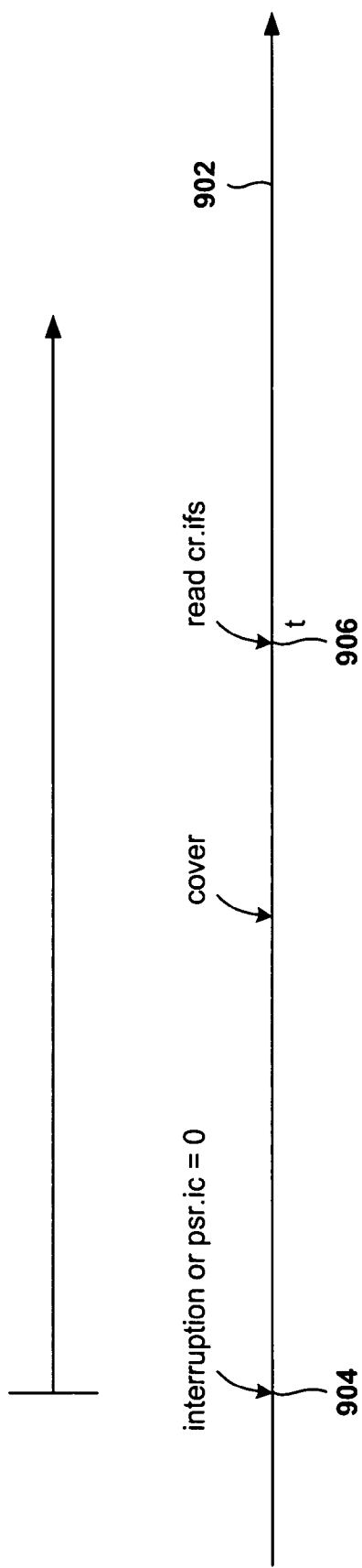
FIG. 9 illustrates the general concept behind virtualization of the cover instruction by certain embodiments of the present invention.

Embodiments of the present invention are directed to efficient emulation of the cover instruction by a virtual monitor. FIG. 9 illustrates the general concept behind virtualization of the cover instruction by certain embodiments of the present invention. In FIG. 9, a horizontal time line 902 is provided as a reference for several events. This time line can be thought of as representing real time, or, more accurately, as instruction-execution progress. FIG. 9 illustrates critical events that occur close to execution a cover instruction by an operating system that may need to be emulated by a virtual monitor or, in other words, that may need to be virtualized. Emulation is needed only when the cover instruction is executed by code running when PSR.ic has the value "0." PSR.ic has the value "0" either as a result of the occurrence of an interruption, or by explicit setting of PSR.ic to "0." Thus, either the occurrence of an interruption or the explicit setting of PSR.ic to "0" represents the left-hand edge 904 of a window, in time or instruction-execution progress, within which execution of a cover instruction may need to be emulated by a virtual monitor. Execution of the cover instruction by an operating system running at less-than-highest privilege level does allocate an empty stack frame and relegates registers of the previous stack frame to the dirty-register category. However, execution of the cover instruction by an operating system running at less-than-highest privilege level does not copy the contents of the CFM register to CR[IFS].ifm. Failure to copy the CFM register to CR[IFS].ifm is manifested only when the operating system attempts to read the contents of CR[IFS] following execution of the cover instruction. Thus, a read of CR[IFS] represents a right-hand boundary 906 of a time or instruction-execution-progression window within which a cover instruction may need to be emulated. The window may continue rightward in time to encompass multiple reads of CR[IFS] up until execution of an rfi instruction or explicit setting of PSR.ic to the value "1."

Fortunately, the virtual monitor is automatically invoked by an interruption, an explicit setting of PSR.ic to zero, or by an attempt to read the contents of CR[IFS]. Occurrence of an interruption in the IA-64 architecture automatically sets the privilege level to "0." An attempt by a routine not running at privilege level 0 to store a value into, or read a value from, a system register generates a privilege-instruction trap. Therefore, the virtual monitor needs only to determine, at the point in time that the operating system attempts to read the contents of CR[IFS], whether a cover instruction has been executed prior to the attempt to read CR[IFS] and subsequent to the occurrence of an interruption or explicit setting of PSR.ic to zero. Moreover, if the contents of CR[IFS] need to be emulated by the virtual monitor, the virtual monitor needs to store the current contents of the CFM register internally in order to have the stored CFM-register value available for emulating a read of CR[IFS].ifm. In order to effect virtualization of the cover instruction according to embodiments of the present invention, the contents of the CFM register are stored upon detection of the left-window-boundary event 904, and performance monitoring is configured to allow the virtual monitor to determine whether or not a cover instruction has been executed within the time or instruction-execution-progress window prior to an attempt by the operating system to read the contents of CR[IFS].

Figure 10:
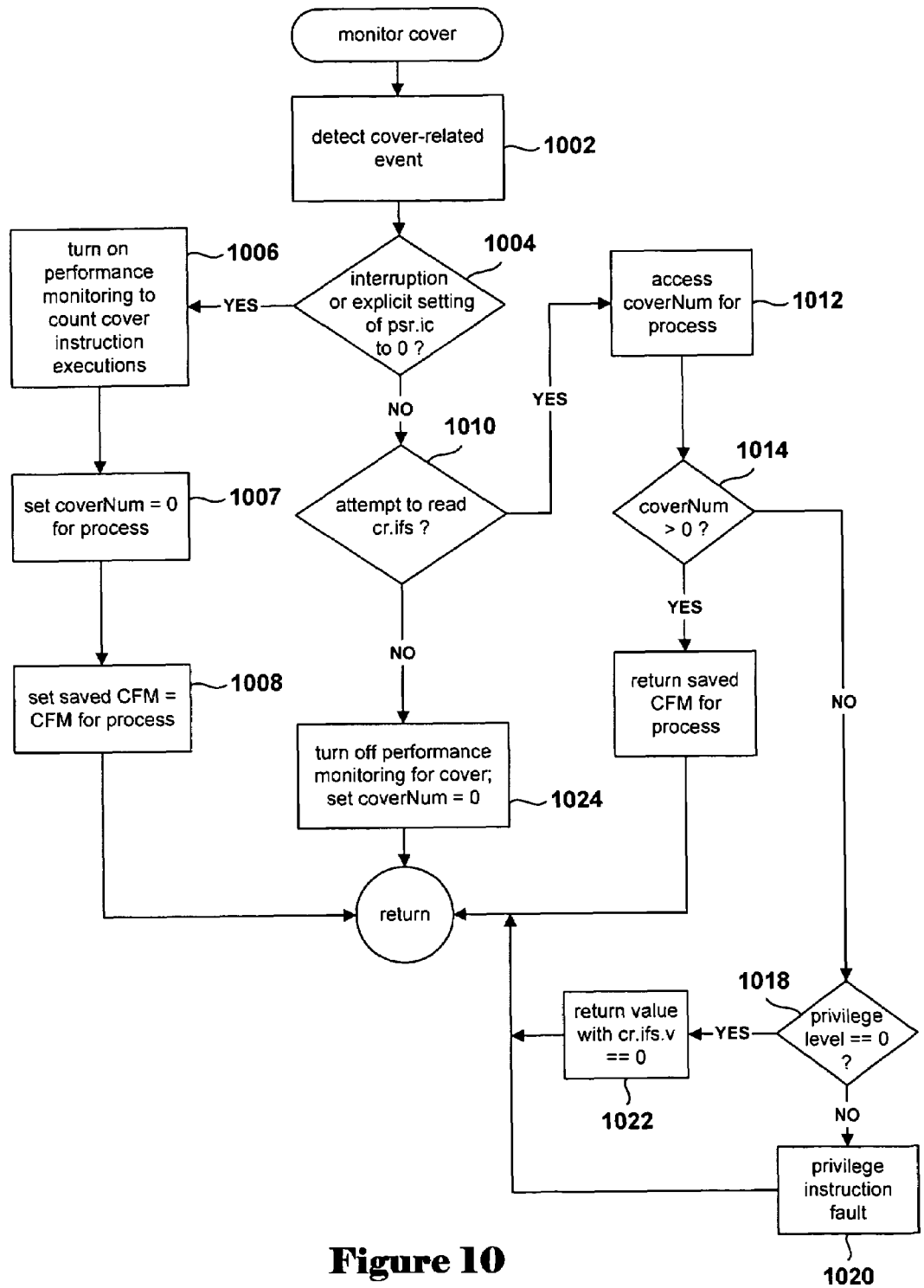
FIG. 10 is a control-flow diagram illustrating an embodiment of the present invention.

FIG. 10 is a control-flow diagram illustrating an embodiment of the present invention. In step 1002, the virtual monitor detects a cover-instruction-related event. This may be the occurrence of an interruption and execution of a virtual-monitor interrupt handler, or explicit access to PSR.ic or CR[IFS].ifm. If the cover-instruction-related event is the occurrence of an interruption or explicit setting of PSR.ic to "0," as determined in step 1004, then the virtual monitor configures performance monitoring to count execution of cover instructions in step 1006. Performance monitoring is an implementation-dependant feature of IA-64 processors. In general terms, in order to turn on performance monitoring, the virtual monitor needs to alter values in the performance monitor configuration system registers in order that one of the performance monitor data application registers is incremented each time a cover instruction is executed. In step 1007, the virtual monitor initializes the configured performance monitor data application register to have the value "0." In step 1008, the virtual monitor stores the contents of the CFM register into an internal, CFM storage location associated with a currently running process. If, on the other hand, the detected cover-instruction-related event in step 1002 is an attempt to read CR[IFS], as detected in step 1010, then, in step 1012, the virtual monitor accesses the performance monitor data application register and reads the number of times a cover instruction has been executed in order to determine whether or not a cover instruction has been executed within the current time or instruction-progression-execution window in step 1014. If, as detected in step 1014, a cover instruction has been executed, the virtual monitor returns the saved CFM, along with a v field value of "1," to the process attempting to read CR[IFS] in order to emulate the contents of CR[IFS]. If the cover instruction has not been executed, as determined in step 1014, then, in step 1018, the virtual monitor determines whether the virtual privilege level is "0." If so, then, in step 1020, the virtual monitor emulates access to CR[IFS] by simulating a privilege instruction fault. Otherwise, the virtual monitor returns a CR[IFS] value with CR[IFS].v equal to "0," indicating that the contents of CR[IFS].ifm are invalid, in step 1022. If the detected cover-instruction-related event is not an interruption or explicit setting of PSR.ic to zero, and is not an attempt to read CR[IFS], then the detected cover-related event must be either explicit setting of PSR.ic to "1," transition to a virtual privilege level less than virtual privilege level "0," or execution of an rfi instruction by the operating system that is trapped and emulated by the virtual monitor. In these cases, the virtual monitor accesses the performance monitor configuration system register to turn off performance monitoring for the cover instruction, and sets the contents of the performance monitor data application register that counts execution of the cover instruction to "0," in step 1024.

Although the present invention has been described in terms of a particular embodiment, it is not intended that the invention be limited to this embodiment. Modifications within the spirit of the invention will be apparent to those skilled in the art. For example, in other architectures similar to IA-64, methods other than performance monitoring may be employed to detect execution of the cover instruction. Moreover, the general method of the present invention may be used to virtualize instructions similar to the cover instruction that are not privileged, but have different behaviors depending on whether they are executed at privilege level zero or at lower privilege levels.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for virtualizing a non-privileged computer instruction with at least two types of execution behavior, depending on prior events and on a current privilege level, the method comprising:
   detecting a first event that causes a first type of execution behavior upon subsequent execution of the non-privileged instruction;
   configuring a detection mechanism that detects subsequent execution of the non-privileged instruction;
   when a second event is detected, determining whether or not, by accessing the detection mechanism, the non-privileged instruction was executed following occurrence of the first event; and
   when the non-privileged instruction is determined to have executed following occurrence of the first event, emulating the first type of execution behavior.

2. The method of claim 1 wherein the non-privileged instruction is an empty-stack-frame-allocation instruction.

3. The method of claim 2 wherein detecting the first event further includes detecting one of:
   an attempt to set a system register to configure the empty-stack-frame-allocation instruction to automatically store contents of a current-frame-marker register in a special register; or
   an interruption.

4. The method of claim 3 further including:
   following detection of the first event, storing the contents of the current-frame-marker register in memory for future access.

5. The method of claim 4 wherein configuring a detection mechanism further includes:
   configuring a performance monitor configuration register to count the number of times the empty-stack-frame-allocation instruction is executed after configuration of the performance monitor configuration register.

6. The method of claim 5 wherein the second event is an attempt to read the special register that contains the stored contents of the current-frame-marker register.

7. The method of claim 6 further including:
   when non-privileged code has attempted to read the special register that contains the stored contents of the current-frame-marker register,
      when a performance monitor data register indicates that an empty-stack-frame-allocation instruction has been executed, returning the contents of the current-frame-marker register stored in memory to the non-privileged code to emulate reading of the special register that contains the stored contents of the current-frame-marker register;
      when the performance monitor data register indicates that an empty-stack-frame-allocation instruction has not been executed,
         when the non-privileged code is running at virtual privilege level 0, returning a special-register value with a special-register-value field set to indicate that the special register does not contain valid stored contents of the current-frame-marker register, and,
         when the non-privileged code is not running at virtual privilege level 0, returning a privileged instruction fault.

8. Computer instructions encoded in a computer-readable medium that implement the method of claim 1.

\* \* \* \* \*